(12) United States Patent
Farmakis et al.

(10) Patent No.: US 6,314,366 B1
(45) Date of Patent: Nov. 6, 2001

(54) SATELLITE BASED COLLISION AVOIDANCE SYSTEM

(76) Inventors: Tom S. Farmakis, 100 Indian Creek Trail, Sharpsburg, GA (US) 30277; Russell D. Routsong, 706 Bookman Point, Peachtree City, GA (US) 30269

( * ) Notice: Subject to any disclaimer, the term of this patent is extended or adjusted under 35 U.S.C. 154(b) by 0 days.

(21) Appl. No.: 08/291,564

(22) Filed: Aug. 16, 1994

Related U.S. Application Data

(63) Continuation-in-part of application No. 08/275,547, filed on Jul. 15, 1994, now abandoned, and a continuation-in-part of application No. 08/062,406, filed on May 14, 1993, now Pat. No. 5,351,194.

(51) Int. Cl.[7] .................................................. G01S 3/02
(52) U.S. Cl. ...................... 701/201; 701/213; 342/357.1; 342/451; 455/456; 340/961
(58) Field of Search ...................... 364/449, 461, 364/452, 460, 444, 443; 340/961, 450, 451, 463; 342/41, 36, 455, 357.07, 357.1, 451; 701/14, 200, 120; 703/213; 455/456

(56) References Cited

U.S. PATENT DOCUMENTS

| | | |
|---|---|---|
| Re. 32,856 | 2/1989 | Millsap et al. . |
| 2,698,391 | 12/1954 | Braden et al. . |
| 2,748,759 | 6/1956 | Schiffer . |
| 2,836,732 | 5/1958 | Newlin . |
| 2,975,296 | 3/1961 | Dominguez-Rego . |
| 3,078,834 | 2/1963 | Wright . |
| 3,357,417 | 12/1967 | Baumann . |
| 3,455,403 | 7/1969 | Hawthorne . |
| 3,530,846 | 9/1970 | Bean et al. . |
| 3,538,898 | 11/1970 | Edgemir . |
| 3,633,040 | 1/1972 | Baxter . |
| 3,657,720 | 4/1972 | Avdenko et al. . |
| 3,696,333 | 10/1972 | Mott . |
| 3,718,899 | 2/1973 | Rollins . |
| 3,808,598 * | 4/1974 | Carter .............................. 343/112 TC |
| 3,824,469 | 7/1974 | Pistonbatt .............................. 325/39 |
| 3,824,595 | 7/1974 | Hall . |
| 3,870,994 | 3/1975 | McCormick et al. ............ 343/6.5 R |
| 3,886,515 | 5/1975 | Cottin et al. . |
| 4,039,957 | 8/1977 | Jennings . |
| 4,107,675 | 8/1978 | Sellers ............................ 343/6.5 LC |
| 4,177,466 | 12/1979 | Reagan . |
| 4,197,538 | 4/1980 | Stocker |
| 4,200,080 | 4/1980 | Cook et al. . |
| 4,236,594 | 12/1980 | Ramsperger . |
| 4,325,057 | 4/1982 | Bishop . |
| 4,380,050 * | 4/1983 | Tanner .................................. 364/461 |
| 4,392,059 | 7/1983 | Nespor . |
| 4,503,525 | 3/1985 | Malik et al. . . |

(List continued on next page.)

FOREIGN PATENT DOCUMENTS 0123 562   1/1984   (EP) .................................. G01S/5/02

OTHER PUBLICATIONS

1985 Derwent Publications Ltd., Abstract Location and waiting time indicator esp. for buses—has bus–stop transponders linked to telephone network and buses which emit signals corresponding to location.

(List continued on next page.)

*Primary Examiner*—Kevin J. Teska
*Assistant Examiner*—Thai Phan
(74) *Attorney, Agent, or Firm*—Sughrue, Mion, Zinn, Macpeak & Seas, PLLC

(57) ABSTRACT

This invention provides a method and apparatus to provide coordinated evasive maneuver commands to aircraft to avoid collisions. More specifically, the invention comprises a GPS system to determined the location of aircraft, control logic to calculate evasive maneuvers, display aircraft tracking information, coordinate the evasive maneuver with the intruding aircraft, and give a synthetic voice warning and command to the pilots.

9 Claims, 13 Drawing Sheets

U.S. PATENT DOCUMENTS

| | | |
|---|---|---|
| 4,606,307 | 8/1986 | Cook . |
| 4,622,557 | 11/1986 | Westerfield . |
| 4,630,289 | 12/1986 | Wren ..................................... 375/71 |
| 4,642,775 | 2/1987 | Cline et al. ........................... 364/443 |
| 4,673,936 | 6/1987 | Kotoh ..................................... 342/51 |
| 4,674,454 | 6/1987 | Phairr . |
| 4,688,026 | 8/1987 | Scribner et al. ..................... 340/572 |
| 4,688,244 | 8/1987 | Hannon et al. . |
| 4,704,735 | 11/1987 | Swapp et al. . |
| 4,718,080 | 1/1988 | Serrano et al. . |
| 4,736,461 | 4/1988 | Kawasaki et al. . |
| 4,750,197 | 6/1988 | Denekamp et al. . |
| 4,754,255 | 6/1988 | Sanders et al. . |
| 4,794,649 | 12/1988 | Fujiwara . |
| 4,797,677 * | 1/1989 | MacDoran et al. ................... 342/352 |
| 4,809,316 | 2/1989 | Namekawa et al. . |
| 4,818,998 | 4/1989 | Apsell et al. .......................... 342/44 |
| 4,821,309 | 4/1989 | Namekawa . |
| 4,860,336 | 8/1989 | D'Avello et al. . |
| 4,882,696 * | 11/1989 | Nimura et al. ........................ 364/449 |
| 4,884,208 * | 11/1989 | Marinelli et al. ..................... 364/460 |
| 4,887,064 | 12/1989 | Drori et al. . |
| 4,888,595 | 12/1989 | Friedman ............................. 342/457 |
| 4,891,650 | 1/1990 | Sheffer . |
| 4,893,240 | 1/1990 | Karkouti . |
| 4,894,655 * | 1/1990 | Joguet et al. ......................... 340/988 |
| 4,896,154 * | 1/1990 | Factor et al. .......................... 364/449 |
| 4,897,642 | 1/1990 | DiLullo et al. . |
| 4,904,983 | 2/1990 | Mitchell . |
| 4,905,271 | 2/1990 | Namekawa . |
| 4,908,627 | 3/1990 | Santos .................................. 342/125 |
| 4,908,629 | 3/1990 | Apsell et al. ......................... 342/457 |
| 4,910,493 | 3/1990 | Chambers et al. . |
| 4,928,778 | 5/1990 | Tin . |
| 5,014,206 | 5/1991 | Scribner et al. ..................... 364/449 |
| 5,021,794 | 6/1991 | Lawrence ............................. 342/457 |
| 5,025,247 | 6/1991 | Banks ................................... 340/574 |
| 5,025,382 | 6/1991 | Artz ...................................... 364/439 |
| 5,043,736 | 8/1991 | Darnell et al. ....................... 342/357 |
| 5,043,903 | 8/1991 | Constant . |
| 5,055,851 | 10/1991 | Sheffer ................................. 342/457 |
| 5,081,667 | 1/1992 | Drori et al. . |
| 5,099,245 | 3/1992 | Sagey ................................... 342/357 |
| 5,103,459 | 4/1992 | Gilhousen et al. ...................... 375/1 |
| 5,109,341 | 4/1992 | Blackburn et al. ............. 364/424.05 |
| 5,119,102 | 6/1992 | Barnard . |
| 5,153,836 * | 10/1992 | Fraughton et al. ................... 364/461 |
| 5,168,451 | 12/1992 | Bolger . |
| 5,197,009 | 3/1993 | Hoffman, Jr. et al. . |
| 5,208,590 | 5/1993 | Pitts . |
| 5,208,591 * | 5/1993 | Ybarra et al. ........................ 340/961 |
| 5,208,756 | 5/1993 | Song . |
| 5,210,534 * | 5/1993 | Janex ................................... 340/984 |
| 5,216,429 | 6/1993 | Nakagawa et al. .................. 342/450 |
| 5,218,367 | 6/1993 | Sheffer et al. ....................... 342/457 |
| 5,218,629 | 6/1993 | Dumond, Jr. . |
| 5,221,925 | 6/1993 | Cross . |
| 5,223,844 | 6/1993 | Mansell et al. ...................... 342/357 |
| 5,243,529 | 9/1993 | Kashiwazaki . |
| 5,247,564 | 9/1993 | Zicker . |
| 5,301,368 | 4/1994 | Hirata . |
| 5,325,302 * | 6/1994 | Izidon et al. ......................... 364/461 |
| 5,351,194 * | 9/1994 | Ross et al. ........................... 364/449 |
| 5,388,047 * | 2/1995 | Ryan et al. .......................... 364/461 |

OTHER PUBLICATIONS

Benenson, T., "GPS Test: Five Leading Aviation HandHelds Go Head–to–Head," *Flying*, Feb., 1994.

CAS–81 Traffic Alert and Collision Avoidance System, *Maintenance Manual* 34–45–00 I.B. 1181, Allied Signal Aerospace Company, Jan. 1990.

Connes, K., "GPS," *Plane & Pilot*, pp. 22–24, Aug., 1994.

Delta Air Lines "Cat II/III Operations—Technical Operations Training Course #401," Apr. 6, 1990.

Delta Air Lines Flight Operations Policy Manual, Jan. 29, 1993.

Gilbert, C., "Obtaining Real–time Differential Data from Government Sources," *Earth Observation Magazine*, Nov./Dec. 1993.

International Teletrac Systems, "How to Put Your Fleet on the Map", Advertising Flyer, undated, 5 pages.

Klass, Philip J., "Airline Officials Forsee Quick Growth in Use of GPS, Glonass on Commercial Transports", *Aviation Week and Space Technology*, Jun. 29, 192, p. 54.

Klass, Philip J., "FAA Steps Up Program to Introduce GPS as Instrument Approach Aid", *Aviation Week and Space Technology*, Aug. 17, 1992, pp. 35–36.

Magnavox Advanced Products and Systems Company (Advertising Flyer), "Presenting the Most Advanced AVLS Available," 1988, 6 pages.

Meluso, D., "Accuracy Guaranteed," *Boating*, Sep., 1993.

Mets, Inc. (Indianapolis, Indiana), "Public Safety Police, Fire and Emergency Medical Services", 1989, 4 pages.

Morgen–Walke Associates, Inc. News Release "Trimble Announces New Generation of GPS Marine Products," Jan. 5, 1994, London, U.K.

Trimble Navigation (Sunnyvale, California), "Fleetvision Integrated Fleet Management System", undated, 9 pages.

Trimble Navigation (Sunnyvale, California), "Trimble's GPS/AVL Continues to Dominate Public Safety Market," Press Release, Feb. 7, 1994.

Trimble Navigation, "FleetVision—Integrated Fleet Management System," (undated).

Trimble, "The 9th Utility" Advertisement.

* cited by examiner

SATELLITE BASED COLLISION AVOIDANCE SYSTEM

CROSS REFERENCE TO RELATED APPLICATIONS

This application is a continuation-in-part of application Ser. No. 08/062,406, filed May 14, 1993 now U.S. Pat No. 5,351,194 and incorporated herein by reference, and is a continuation-in-part of copending application Ser. No. 08/275,547, filed Jul. 15, 1994 now Abandoned.

BACKGROUND OF THE INVENTION

This invention relates generally to an automatic collision avoidance control and alert system for tracking and directing aircraft and other vehicles for collision avoidance. More specifically, the invention is an improved collision avoidance system for use in automatically alerting a pilot of a collision threat and coordinating an evasive maneuver between aircraft. The expected advantages of such a system is improved collision avoidance, elimination of false collision alarms and an increased target tracking capacity. The present invention is directed to such an automatic vehicular-based system for automatically providing collision avoidance.

Since the advent of aviation it has been desirable to avoid aircraft collisions and near misses. Traditionally, pilots have used a wholly manual method, i.e. visually identifying other aircraft and flying to avoid a collision. Such a system is susceptible to human error and is wholly unworkable in low visibility conditions or within crowded airspace.

The use of a ground based air traffic control (ATC) system, two-way voice radio communications and RADAR greatly enhance the identification and control of aircraft to avoid collisions. Two-way voice radio communication allows aircraft to communicate with one another and the ATC operator to avoid potential conflicts. RADAR, both on-board aircraft and at ground based ATC facilities provides an operator intensive technique for avoiding aircraft collisions. In the present ATC system the ATC operator coordinates the location, altitude, and track of all aircraft within her assigned control area by communicating with the aircraft over two-way voice radio. Present ATC systems consist of a network of airport terminal area and enroute surveillance radar systems. These systems consist of both primary and secondary RADAR systems and computers that display usable data for the control of air traffic in the national and international airspace systems.

The basic ATC RADAR system consists of Primary RADAR and secondary RADAR. Primary RADAR operates by transmitting a high power, highly directional radio pulse at a known azimuth (direction, in degrees from North) from a rotating antenna and measures the time it takes to receive the reflected signal from an object (aircraft) in space back to the point of transmission. This time factor determines the range in nautical miles from the radar site to the target. The direction of the target is determined by the antenna azimuth from which the signal is received. The limitations of using only this system result in the loss of targets because of the difficulty in detecting weak reflected RADAR return signals attenuated by atmospheric conditions and the difficulty in operating a synchronized height finding radar.

Secondary RADAR known as the Air Traffic Control Radar Beacon System (ATCRBS) utilizes cooperative equipment (a radio receiver/transmitter or transponder) located in the target aircraft to replace the conventional radar's passive reflected return signal with an active reply signal. Like a conventional high power radar, ground based secondary radar transmits a highly directional pulse from a rotating antenna that is usually synchronized with the primary radar antenna. The secondary radar pulse is called the interrogating signal. The interrogating signal requires much less power than conventional radar because secondary radar relies on an active return signal from the target aircraft. In response to receiving the interrogating signal the cooperative aircraft transponder automatically transmits a distinctive reply signal back to the secondary radar's antenna. The secondary radar measures the time between the interrogating signal transmission and the transponder reply signal and, like the reflected return in primary radar, uses this time delay to determine the range of the target aircraft. The direction of the target aircraft is determined by the antenna azimuth from which the reply signal is received. The secondary radar's cooperative transponder improves on the conventional radar's passive reflective return by encoding additional information in the transponder reply signal. The additional information includes an aircraft identification number and the aircraft pressure altitude. For example, Delta flight 195 to Dallas (Dall95) is requested by ground based ATC to squawk "4142". In response, the aircraft pilot manually dials in "41420" at the aircraft transponder control panel. The transponder control logic can now encode the assigned four digit identification, e.g. "4142", on the transponder reply signal. The aircraft's transponder can also be connected to the aircraft's pressure altimeter to enable the transponder control logic to encode the aircraft pressure altitude on the transponder reply signal. The aircraft transponder reply signal containing the encoded aircraft identification and pressure altitude is processed by ground based computers for display on the ATC operator's radar screen. The ATC operators usually provide specific flight instructions to aircraft to avoid flight conflicts and warn aircraft of other nearby aircraft. In large aircraft, active on-board conventional nose RADAR may also identify aircraft that are in front of the large aircraft.

RADAR, however, has a number of disadvantages. Radar systems, even secondary radar, provides limited range and accuracy in the determination of the location and altitude of an aircraft. The range of radar is inherently limited due to obstacles in the line of sight of the radar, curvature of the earth, atmospheric conditions, etc., and is subject to provide false readings or ghosts. RADAR may also fail to provide sufficient target resolution at the critical near collision phase where target aircraft are close together. Radar coverage is not available in many areas of the world, and is not available at all altitudes in the United States.

The presently used and Federal Aviation Administration (FAA) approved aircraft collision avoidance system is known as the Traffic Alert and Collision Avoidance System (TCAS). The TCAS is an airborne traffic alert and collision avoidance advisory system that operates without support from ATC ground stations. TCAS detects the presence of nearby intruder aircraft equipped with transponders that reply to secondary radar interrogating signals. TCAS tracks and continuously evaluates the threat potential of these aircraft in relation to one's own aircraft, displays the nearby transponder-equipped aircraft on a traffic advisory display, and during threat situations provides traffic advisory alerts and vertical maneuvering resolution advisories (RA) to assist the pilot in avoiding mid-air collisions. A TCAS has a transmitter, a transmit antenna, a transponder, one or two directional receiver antennae, a control interface, display unit(s), and a signal/control processor.

A TCAS determines the location of other aircraft by using the cooperative secondary radar transponders located in other aircraft. A TCAS transmitter asynchronously polls for other aircraft with an active L-band interrogating signal, i.e. at the same frequency as the ground based secondary radar interrogating signal. The TCAS interrogating signal, however, is an omni-directional signal whereas the ground based secondary radar signal is highly directional. When a target aircraft's cooperative transponder receives a TCAS interrogating signal the transponder transmits a reply signal. By using RADAR timing principals, the interrogating TCAS can measure the time between the interrogating signal transmission and transponder reply to determine the approximate range of the intruder aircraft. By using direction finding antenna techniques, the interrogating TICAS determines the relative direction of the transponder reply signal with a fixed directional antenna array and the TCAS signal processor. The TCAS omni-directional interrogating signal causes all secondary radar cooperative transponders within receiving range to reply, therefore, the TCAS signal processor uses a complex receiver input blanking scheme to locate and distinguish the multiple reply signals. For example, the TCAS interrogating signal is coordinated with the TCAS signal processor to allow the TCAS signal processor to create a variable width receiver blanking signal. The variable width receiver blanking signal is used to progressively exclude "closer" transponder reply signals. This allows the TCAS interrogator signal and transponder reply signal processor to receive transponder replies from progressively further away aircraft.

The TCAS control logic uses the range, relative bearing, and pressure altitude determined by the interrogating signal and secondary radar transponder replies to track intruder aircraft. The intruder track is displayed on the TCAS display. The TCAS display is a VDU typically mounted on the aircraft front instrument panel. TCAS tracking information, graphically depicting the relative distance and relative bearing of intruder aircraft, greatly assists a pilot in identifying and visually acquiring intruder aircraft. The TCAS control logic also calculates the "tau" of the intruder aircraft. "Tau" is the ratio of range to range-rate, and represents the time to intercept for two aircraft on a collision course, assuming un-accelerated relative motion. The TCAS compares the "tau" with pre-determined collision threat parameters. If an intruder aircraft falls within these parameters a TCAS declares the intruder aircraft a threat. The pre-determined collision threat parameters delineate the intruder aircraft "tau" into four threat categories. In most categories the TCAS merely brings the intruder status to the pilot's attention with an audible alert on the aircraft intercom. In the highest category the TCAS creates an evasive maneuver to vector both aircraft to increase the vertical separation between the aircraft. For situations where one's own TCAS equipped aircraft and another TCAS equipped aircraft are declared collision threats to each other, the TCAS in each aircraft in conjunction with their secondary radar transponder subsystem, establish an air-to-air resolution advisory in both aircraft. The resolution advisory is displayed on the TCAS display unit. The resolution advisory is a directive to the pilots to either climb or descend.

The TCAS system, however, suffers from a number of disadvantages. First, the TCAS system issues numerous false alarms and/or erroneous commands or instructions. Erroneous commands and false alarms may increase the probability of collision by erroneously instructing the aircraft to fly nearer the intruding aircraft, or to descend when the aircraft is already at a minimal altitude. Such false alarms and erroneous instructions are prevalent during take-off and landing where the TCAS has particular trouble discerning signals from the many nearby aircraft. Such false alarms, in addition to distracting the pilot, can create distrust in the entire TCAS system. This distrust can cause a pilot to hesitate or ignore a valid evasive maneuver or resolution advisory command because the pilot mistakenly believes the command is just "another" TCAS false alarm. Another source of TCAS false alarms is an overly simplistic collision prediction algorithm, i.e. the "tau" calculation. The TCAS collision alert algorithm does not account for whether an aircraft is proceeding on it's present course or is leveling off at a predetermined altitude, i.e. it assumes an un-accelerated aircraft track. Such problems are reported by Dave Davis and Michael Sangiacomo in Jets in Jeorardy; False Warnings from Midair Collision System have Led Airline Pilots to Near Catastrophe, The Plain Dealer, Jul. 14, 1994, at 1A. The Plain Dealer investigative reporters discovered that within the span of a few months, TCAS false alarms nearly caused several aircraft disasters. Furthermore, some pilots state that the TCAS is so unreliable in crowded airspace that the TCAS does not work at all under these conditions.

Second, TCAS requires an elaborate direction finding antenna array and processing logic to find an intruder's relative direction. Such a system is inherently susceptible to multipath errors, noise clutter, and other spurious signals. Again, this can create false alarms, false returns or phantom aircraft and incorrect tracking displays.

Third, intruder pressure altitude information is only transmitted from the TCAS transponder when the TCAS is connected to a pressure altimeter. Thus, the existing TCAS system cannot detect a collision danger with an aircraft that does not have a functional pressure altimeter. Moreover, the pressure altimeter itself is subject to the risk of human error. A pressure altimeter must be periodically adjusted to compensate for local atmospheric conditions and elevations. If the pilot does not make the proper altimeter adjustment then the TCAS transponder will transmit erroneous altitude information. The lack of altitude information or incorrect altitude information seriously undermines the accuracy of the TCAS system.

Fourth, the TCAS interrogator/transponder protocol requires an elaborate antenna sidelobe suppression and receiver blanking technique to block transponder replies from close aircraft and to allow the system to poll aircraft further away. Such a system is again susceptible to noise, signal clutter, other spurious signals and multiple aircraft transponder within the same transponders reply time frame.

ATC systems have been proposed that would use the global positioning system (GPS) satellites. Such a proposed system is discussed in chapter 12 of Logsdon, The Navstar Global Positioning System, Von Neistrand Reinhold (1992). In The Navstar Global Positioning System, Logsdon discusses the proposed use of GPS receivers on board aircraft, wherein the aircraft transmits its GPS aircraft vector to air traffic controllers for display on the air traffic controllers'to screen. Logsdon also discusses another proposed navigation system based on the proposed Geostar satellites. In the Geostar system, when an aircraft needs to know its location, interrogation pulses are transmitted from the aircraft to three Geostar satellites, which immediately relay the request to a centrally located computer on the ground. The ground computer determines the location of the aircraft and relays the location back to the aircraft using one of the satellites. The Geostar system was described as also being able to relay short telegram messages between two Geostar subscribers (aircraft) using one of the satellites. This proposed Geostar navigation system suffers from a number of drawbacks. For example, as with TCAS, each aircraft does not provide its location, speed, heading to other aircraft. Instead, in Geostar, aircraft must rely on the extensive ground-based processing before the aircraft can obtain its own position. Furthermore, the Geostar system provides no technique for reducing collision of aircraft.

Other navigation aides are know to the art. In the 48 contiguous United States, most instrument navigating is done with the aid of a VHF Omnidirectional Range (VOR) receiver for using the VHF radio signals emitted by the ground based VOR transmitters. Virtually all enroute navigation and many instrument approaches use these signals, which are broadcast in the frequency range 108.0 to 119.0 Mhz. The VOR signal is a blinking omnidirectional pulse, and has two parts: a reference phase signal and the variable phase signal. It is transmitted in such a way that the phase between these two signals is the same as the number of degrees the receiving aircraft is from the VOR station. The VOR receiver and equipment uses the signals to determine the aircraft direction, or course, from the VOR.

An additional navigation aide is known as Distance Measurement Equipment (DME). DME uses two-way (interrogation and reply) active spherical ranging to measure the slant range between the aircraft and the DME transmitting station. Many pilots and navigators vector airplanes from waypoint to waypoint using the signals from VOR/DME, rather than traveling in a straight line. As a result, aircraft are not traveling the shortest distance, causing increased fuel usage and increased travel time. Also, routes along the VOR/DME stations become heavily traveled resulting in increased probability of mid-air collisions.

In addition, many aircraft employ so-called Instrument Landing Systems (ILS) for performing precision landings. ILS includes several VHF localizer transmitters that emit focused VHF signals upwardly from the airport to provide horizontal guidance to the aircraft and its autopilot systems. ILS also includes a UHF glideslope transmitter that radiates a focused UHF signal that angles downwardly across the runway to provide vertical guidance. While ILS provides an effective technique for precision landings, such ILS precision landings are not possible where the airport does not include such localizer and glideslope transmitters.

SUMMARY OF THE INVENTION

Accordingly, it is an object of the present invention to provide an improved automatic collision avoidance system based on satellite navigation signals.

It is a further object of the present invention to provide an improved automatic collision avoidance system based on the global positioning system and a direct radio wave inter-aircraft radio network synchronized with the GPS precision clock.

It is yet another object of the present invention to provide an improved automatic collision avoidance system based on the global positioning system that is backward compatible with existing collision avoidance systems.

It is yet another object of the present invention to provide an improved automatic collision avoidance system based on the global positioning system, a direct radio wave multipoint network synchronized with the GPS precision clock, and ground based pseudo-satellites navigation enhancement signals.

It is yet another object of the present invention to provide an automatic collision avoidance system based on the global position system, a direct radio wave multipoint network synchronized with the GPS precision clock, and communication with fixed navigation obstructions equipped with a collision avoidance beacon.

It is yet another object of the present invention to provide an automatic collision avoidance system based on the global positioning system, a direct radio wave multipoint network synchronized with the GPS precision clock, and an interface with the automatic navigation system or auto-pilot to control the anti-collision maneuver without pilot intervention.

In accordance with the present invention, an improved automatic collision avoidance system for guiding vehicles is provided which includes a sensing system for receiving GPS signals, an apparatus for translating the GPS signals to determine the GPS location, GPS altitude and track, a transceiver system for operating a multipoint direct radio wave protocol synchronized to the GPS precision clock for transmitting the GPS position and receiving other aircraft GPS positions, extrapolating the track of all nearby aircraft and determining whether any aircraft pose a collision threat, control logic to create evasive maneuvers to separate aircraft that are within a predetermined collision track tolerance, and establishing a data link between aircraft to coordinate the evasive maneuver.

BRIEF DESCRIPTION OF THE DRAWINGS

A more complete appreciation of the present invention and many of the attendant advantages thereof will be readily obtained as the invention becomes better understood by references to the following detailed description when considered in connection with the accompanying drawings.

DETAILED DESCRIPTION OF THE INVENTION

Figure 1:
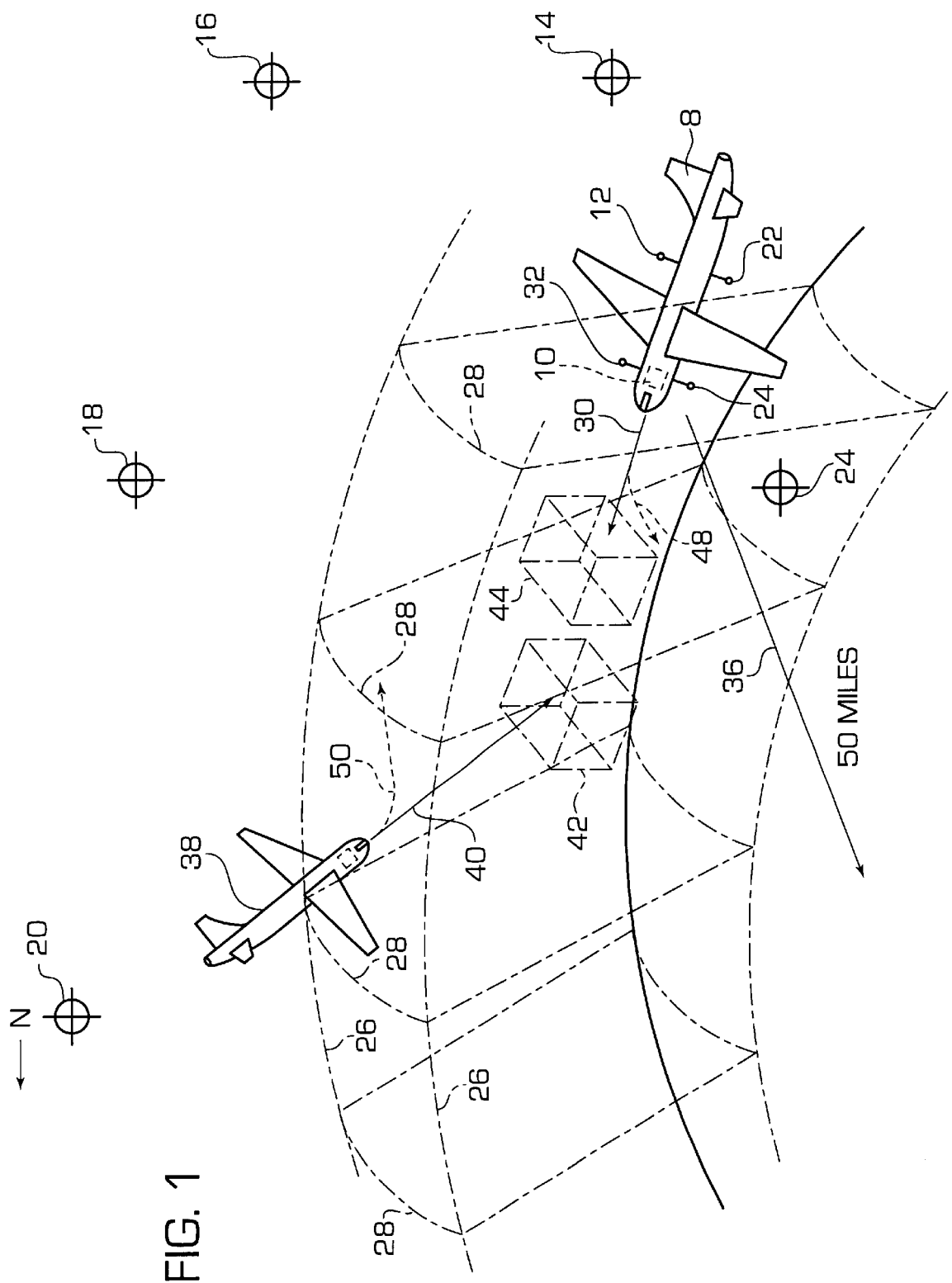
FIG. 1 is a schematic diagram of an improved automatic collision avoidance system in accordance with a preferred embodiment of the present invention.

Referring to the drawings in detail wherein like numerals indicate like elements, FIG. 1 is a schematic diagram of an improved automatic collision avoidance system in accordance with the preferred embodiment of the present invention. The improved automatic collision avoidance system is called the satellite tracking alert resolution system (STARS). The STARS is a self contained airborne collision avoidance system that does not require any ground based support. The aircraft 8 is equipped with a STARS 10. An antenna 12 may be used to receive GPS signals from orbiting GPS satellites a few of which are illustrated as 14, 16, 18, and 20. An optional antenna 22 may be used to receive pseudo-satellite signals from ground based stations 24. Pseudo-satellite signals may be used to increase the navigational accuracy of the STARS. The STARS 10 processes the satellite navigational signals to determine a GPS position and GPS altitude for the aircraft 8. A GPS position is usually represented in the traditional navigational coordinate system in hours, minutes, and seconds 26 from the prime meridian and degrees from north or south of the equator on the so called parallels 28. It is understood that any coordinate system can be used to practice the present invention and is within the scope of the present invention to convert between coordinate systems. The STARS 10 sequentially determines the GPS position and GPS altitude of the aircraft 8. The STARS 10 uses the sequential GPS positions and GPS altitude to determine the track 30 of the aircraft 8. The aircraft track 30 represents the velocity vector of the aircraft 8.

The STARS 10 transmits the aircraft 8 position and the aircraft 8 track 30 on the STARS transceiver antenna 32 and optional antenna 34. The STARS transmit power is calibrated with the STARS receiver signal threshold to enable an effective range of approximately 50 miles 36. It is understood that STARS 10 transmit power and receiver signal thresholds can be adjusted to allow the STARS to operate in a variety of range modes. Moreover, it is understood that the antenna footprint 32 and 34 may be adjusted to allow the STARS 10 to project the STARS transmit signal further, e.g. 80 miles, in front of the aircraft 8 and increase receiver sensitivity to targets in front of the aircraft 8.

An intruder aircraft 38 is equipped with a STARS identical to the STARS 10 and antenna 32, 12, 22 and 34 of aircraft 8. Likewise, the intruder aircraft 38 STARS also sequentially determines aircraft 38 GPS position, GPS altitude and track 40. The intruder aircraft 38 STARS is also transmitting the intruder aircraft GPS position and track on the STARS transceiver. The intruder aircraft 38 STARS transceiver transmit time is synchronized to the aircraft 8 STARS 10 transceiver transmit time with a time division multiple access protocol (TDMA), discussed in detail below. The protocol may maintain synchronization with a common timing source derived from the GPS precision clock. The GPS precision clock is determined from the GPS satellite 14, 16, 18, 20 and pseudo-satellite 24 signals. It is understood that other clocking means such as an internal crystal oscillator may be used to synchronize the TDMA protocol.

The aircraft 8 STARS transceiver antenna 32 and optional antenna 34 receives the transmit signal from intruder aircraft 38. As described in substantive detail below, the aircraft 8 STARS extrapolates the track of aircraft 8 and aircraft 38. It is understood that STARS may extrapolate tracks from a plurality of aircraft. It is also understood that the "tau" as known to the collision avoidance art, i.e. range over range-rate, calculation is within the scope of the present invention and may be used in place of an extrapolated track. The aircraft 8 STARS 10 determines the closest distance between the extrapolated track 44 of aircraft 8 and extrapolated track 42 of aircraft 38. The STARS compares the closest distance between the extrapolated tracks to predetermined safe distance and altitude parameters. Generally, the process of determining the closest distance between the aircraft 8 and 38 is an iterative process which is performed by a sequence of steps programmed into a microcomputer. Consequently, the process of extrapolating tracks, comparing the tracks and determining whether the aircraft 8 will maintain a safe distance from all intruder aircraft is continuously repeated as the aircraft 8 travels through the air. The intruder aircraft 38 simultaneously and independently performs an extrapolation of aircraft tracks 42 and 44, compares the tracks, and determines whether the aircraft 38 will maintain a safe distance from all intruder aircraft.

If aircraft 8 STARS 10 determines that the aircraft 8 will pass by another aircraft, for example aircraft 38, with less than the predetermined safe distance and attitude parameters, then the STARS 10 will generate an evasive maneuver 48 for aircraft 8 to increase the vertical distance between aircraft 8 and aircraft 38. A preferred technique for calculating the evasive maneuver 48 is discussed in substantive detail below but, in general the higher aircraft will be directed to climb and the lower aircraft will be directed to descend. A data link is established, using the STARS transceivers, between the aircraft 8 and 38 to coordinate the evasive maneuver 48. The preferred data link technique is discussed in substantive detail below but, generally, aircraft 38 receives the aircraft 8 evasive maneuver and aircraft 38 generates an opposite evasive maneuver 50. Aircraft 38 STARS transmits the opposite evasive maneuver to aircraft 8 STARS 10. Upon receipt of aircraft 38 STARS opposite evasive maneuver, aircraft 8 STARS 10 in the preferred embodiment alerts and displays the evasive maneuver 48 to the aircraft 8 pilot. Aircraft 8 STARS 10 in the preferred embodiment also transmits that the evasive maneuver is executing to aircraft 38. Aircraft 38, upon receipt of the evasive maneuver executing message alerts and displays evasive maneuver 50 to the aircraft 38 pilot. As discussed in substantive detail below, the STARS has numerous advisory and evasive maneuver commands to resolve numerous possible scenarios between approaching aircraft. Additionally, the communication process between different STARS may include information concerning aircraft identification, status, telemetry from instrumentation, and altitude window information. The altitude window is an altitude set at the STARS control panel by the pilot that indicates the altitude at which the pilot will level off. As discussed more fully below, this information in general may be used to calculate appropriate evasive commands for the aircraft. Thus, the STARS altitude window feature may be used to extrapolate aircraft tracks that are much more accurate than a track extrapolated with a function that assumes all aircraft will remain unaccelerated.

Figure 2:
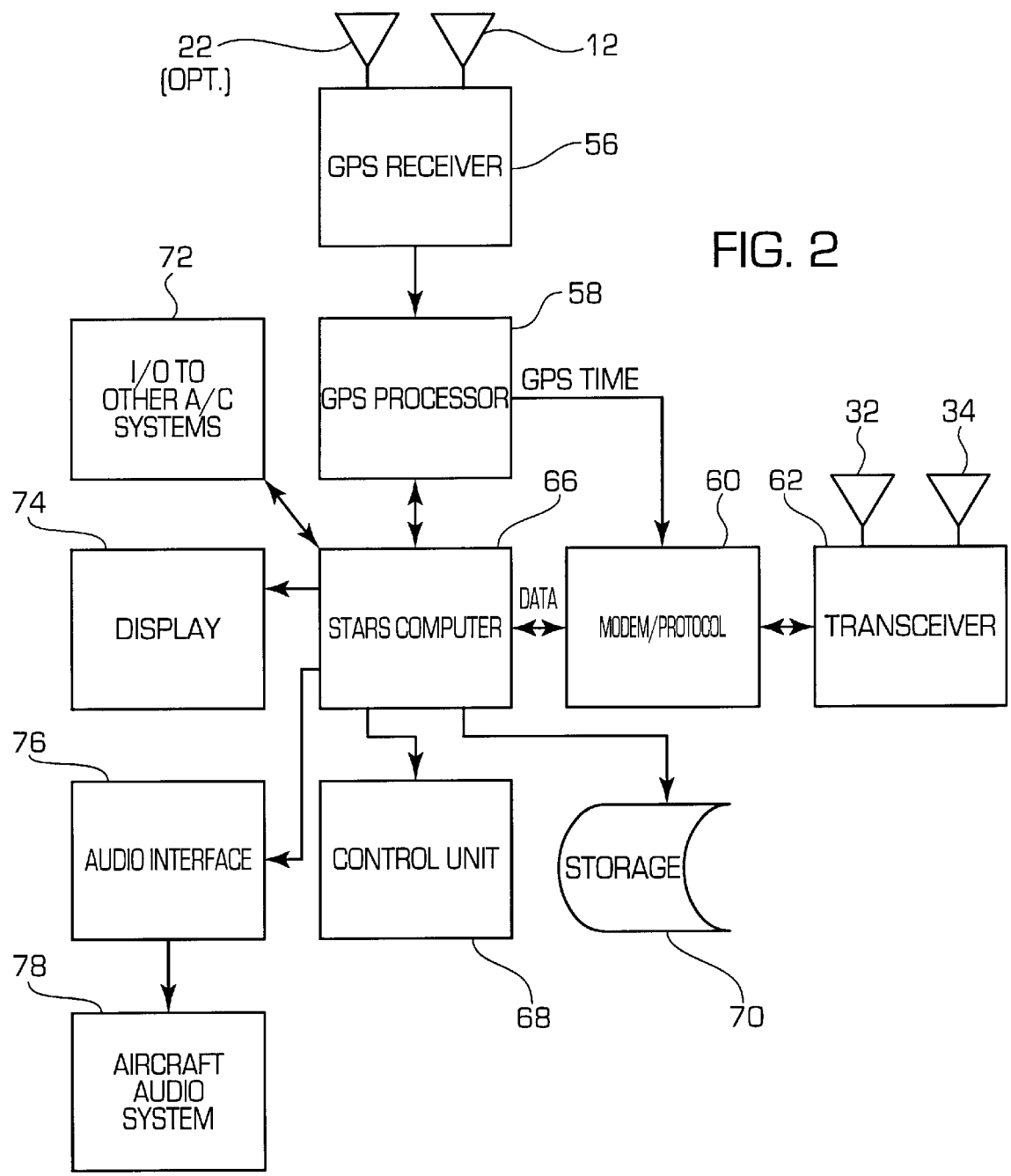
FIG. 2 is an overall functional block diagram of the improved automatic collision avoidance system of FIG. 1.

FIG. 2 is an overall functional block diagram of the STARS system of FIG. 1. The STARS 10 comprises GPS antenna 12, optional GPS antenna 22, GPS receiver 56, GPS processor 58, modem 60, transceiver 62, transceiver antenna 32, optional transceiver antenna 34, STARS computer 66, control unit 68, storage unit 70, input and output interface 72, display unit 74, and audio interface 76. The STARS computer 66 comprises a microprocessor or microcomputer based system having a microprocessor, read only memory (ROM), random access memory (RAM), and input/output ports (I/O ports). It is understood that STARS computer 66 may also comprise any additional circuitry, such as A/D and D/A converters, combinational logic circuitry, latching circuitry, etc., that may be necessary for the operation and interconnection of STARS computer 66 with respect to the components of the STARS 10. All of the above-described components of STARS computer 66 may be located on an individual semiconductor chip. The STARS 10 may also be located on an individual or plurality of custom VLSI chips. The antenna 12 may be an antenna mounted to the top of the aircraft to receive GPS signals from orbiting satellites. Antenna 22 is an optional antenna mounted to the bottom of the aircraft to receive ground based pseudo-satellite signals. Pseudo-satellite signals can be used to increase the positional and altitude accuracy of the STARS 10 during an airport approach or when the aircraft is flying below dense cloud cover. The GPS receiver 56 is used to determine the aircraft's position (longitude, latitude and altitude). Other types of satellite receivers, such as receivers for receiving signals from the Soviet Glonass satellites, may be used. As well understood by those skilled in the art, each GPS satellite transmits binary pulse trains, copies of which are created in the GPS receiver electronics. The GPS receiver antenna detects the signals (binary pulse trains) transmitted from GPS satellites, amplifies the received signals, and inputs them into two tracking loops that lock onto the carrier waves. The GPS pulse train is adjusted in the tracking loop until it is brought into correspondence with the satellite pulse train. When correspondence is achieved, the GPS receiver resident processor can determine signal travel time based on the pulse adjustment. The GPS receiver resident processor then may determine the pseudo-range (distance from the GPS receiver to each satellite) based on the signal travel time (plus or minus clock bias error) multiplied times signal travel time; (pseudo-range=C×delta T). The GPS receiver 56 may then determine its location using four pseudo-ranges, solving four simultaneous equations having four unknowns, as well known to those skilled in the art. The GPS processor 58 may be resident in the GPS receiver or separate. The GPS processor 58 automatically determines the user's current position (longitude, latitude and altitude) tracking and speed.

The GPS receiver 56 should be a multi-channel receiver for receiving positioning signals from a plurality of GPS satellites. A number of GPS receivers are commercially available from such companies as Sony Corporation, Motorola, Rockwell International (the Navcore V GPS receiver), and others. One such commercially available GPS receiver is the Nav 1000 GPS receiver manufactured by Magellan Systems Corporation. The data output by GPS receiver 56 is input to the GPS processor 58.

The GPS processor 58 performs the calculations necessary to determine the aircraft track, speed, and acceleration, and precision GPS time. The precision GPS time can be found by determining the clock bias error as one of the four unknowns in the standard four equation GPS navigation solution. It is well known in the art how to determine an highly accurate clock from the GPS signals. In the preferred embodiment the STARS 10 uses the absolute time synchronization mode. With absolute time synchronization a special time synchronization is derived from a GPS satellite. Absolute time synchronization can achieve accuracy's of about 100 nanoseconds. GPS synchronized time is used to synchronize the modem 60 with other aircraft STARS. It is understood to those skilled in the microprocessor controller arts that the GPS processor functions may be incorporated into a single faster microprocessor to form an integrated STARS computer/GPS signal processor 66 and 58. Such a high speed microcomputer or digital signal processor is the TMS320C40 or TMS320C50 available from Texas Instruments Incorporated.

The modem and data transfer protocol provide communications between STARS. The modem 60 uses a suitable data transmission modulation technique such as frequency shift keying (FSK), pulse position modulation, or quadrature phase shift keying (QPSK) for use with a multiple access protocol. The modulation may be synchronized with GPS precision time. In the preferred embodiment the STARS 10 will transmit and receive on the L-band TCAS interrogator frequency. The multiple access protocol of the preferred embodiment is the time division multiple access protocol (TDMA). TDMA is run by a sequence of computer instructions on the STARS computer 66. The protocol may also execute on its own microprocessor and interface to the STARS processor 66 as a microprocessor peripheral device. The TDMA protocol works by dividing a radio frequency into a fixed number of time slots. For example, a frequency could be divided into 100 time slots where each slot is ¹⁄₁₀₀ of a second. Since the preferred L-band TCAS frequency is very high, approximately 1 Ghz or 1,000,000,000 cycles per second, a time slot of ¹⁄₁₀₀ of a second has a theoretical transmission rate of 1 million bits per second. In practice, however, TDMA throughput is some what less than the theoretical limit because of protocol overhead and synchronization time. The preferred STARS TDMA implementation, discussed in substantive detail below, automatically assigns each STARS within a limited direct radio range a TDMA slot. Each STARS transmits on its assigned slot and receives signals from other STARS on all the other TDMA slots. It is understood that other multiple access protocols such as collision detection re-transmission, spread spectrum techniques and code division multiple access are within the scope of the present invention. The STARS TDMA message has a general broadcast mode and a specific broadcast or data link mode. In the general broadcast mode the STARS 10 transmits on the appropriate TDMA slot a message that all other STARS receivers within the broadcast range will receive and process. In the specific or data link broadcast mode the STARS transmits, on the appropriate time slot, a message with a specific aircraft identification number encoded in the TDMA message. All other STARS receivers within the broadcast range receive and process the data link message. If the message encoded aircraft identification matches a STARS aircraft identification then the STARS whose aircraft identification matches the message processes the message as a specific data link message.

The display unit 74 may be a CRT or other suitable display such as gas plasma, LCD, or active matrix LCD. In the preferred embodiment the display will fit into the standard aircraft instrument hole and can be mounted in the front aircraft instrument panel. Preferably the STARS 10 electronics are located in a separate housing but it is with the scope of the present invention to house the STARS electronics in the display unit 74.

The storage unit 70 is a non-volatile computer memory such as flash memory available from Intel Corporation and Texas Instruments Incorporated or volatile RAM with battery back up. The storage unit 70 may also contain the permanent program memory for the STARS program. The STARS program may be fixed in ROM memory or flash memory. The storage unit 70 may also contain a mass storage device such as a PCI card, floppy disk, or hard disk to store database information. The STARS 10 storage unit 70 may contain a worldwide Jeppesen data base which includes the coordinates of all airports with runways over 1000 feet in length, including airport elevations, VHF, VOR's, and NBD's, and an expanded database, including information, such as airport VHF communication frequencies, fuel availability, instrument landing system (ILS) details, DMES, and intersections.

The audio interface 76 contains a digital to analog converter and is connected to the aircraft audio intercom system 78. The audio interface 76 is used to synthesize speech to notify the aircraft pilot of the STARS alarm status or if necessary the STARS evasive maneuver. A suitable voice synthesizing coder/de-coder digital to analog chip is the TSP53C30 available from Texas Instruments. It is understood that there are a wide variety of D/A chips and digital storage formats available and that these formats and D/A techniques are within the scope of the present invention. In the preferred embodiment the STARS 10 audio alarms may be stored in pulse code modulation or linear predictive coding format. The audio interface 76 is used by STARS 10 to produce audio alarms, synthetic voice alarms and synthetic voice commands into the cockpit via the aircraft intercom system 78.

The peripheral input and output (I/O) control unit 72 contains the circuits necessary, e.g. parallel and serial digital circuits, A/D converters and switch sensors, to interface the STARS 10 to auxiliary aircraft systems and controls. It is understood that the I/O control unit 72 may be a separate set of integrated circuits or may be combined as a subsystem to a custom VLSI STARS computer 66. The peripheral equipment interface to the STARS 10 may be an open and close switch, a parallel or serial digital interface from another on-board system, or an analog signal from an aircraft sensor. For example, one such external control interface is to a switch for detecting whether the landing gear is up or down, another is from an internal high gravity force shock detector. Yet another is from a switch that detects whether the aircraft door or cargo hatch is open. In addition, aircraft subsystems and instrumentation such as data from the ground proximity and wind shear systems, the on-board maintenance computer, the radio altimeter, the roll gyro synchro, the pitch gyro synchro, the magnetic heading synchro, the barometric pressure altitude, the flight recorder, and the autopilot may be connected to the STARS 10 at the I/O control unit 73. It is understood that some aircraft subsystems such as the roll gyro, pitch gyro, and magnetic heading gyro may use either an analog or digital interface signal and that the A/D conversion necessary to interface the STARS 10 to these systems is within the scope of the present invention. It is understood that other aircraft systems may be connected to the STARS 10 and that the STARS 10 TDMA transceiver system 62 may transfer and process data from these other aircraft systems.

The STARS computer 66 is a single or multiple microprocessor or microcomputer based system used to execute the STARS programming. As stated above, in the preferred embodiment the STARS processor may be a TMS320C40 or TMS320C50 general purpose digital signal processor available from Texas Instruments Incorporated. The STARS 10 program is understood to have a multitasking/multiprocessor embodiment as well as a linear program embodiment within the scope of the invention. A multitasking/multiprocessor environment uses a plurality of microprocessors executing computer instructions in parallel with one another. For example, the STARS computer 66 may have a microprocessor for executing the instructions for the TDMA protocol, another microprocessor for executing the instructions for GPS signal processing, and another microprocessor for overall system control that communicates with the TDMA and GPS microprocessors. Thus, the several processors each execute their own particular sequence of instructions (programs) simultaneously, i.e. multitasked. The multiple programs executing on the TDMA and GPS microprocessors may also execute on a single fast microprocessor if the single microprocessor is fast enough to switch between the TDMA and GPS programs to give the two programs the same execution speed as the dual microprocessor configuration, e.g. a multitasked and single processor embodiment. Likewise, all the processing functions TDMA, GPS and control processing may be performed on a single microprocessor if the single microprocessor is fast enough to give all of the processes a sufficient execution speed. In a multitasking environment the multiple processes are executing simultaneously and communicate between processes as if the process are executing independently of one another. Multitasking can be accomplished on a multiprocessor configuration or on a single fast microprocessor. A linear embodiment of the STARS 10 program is also within the scope of the present invention. A linear embodiment of the STARS program is a sequence of instructions that performs all of the necessary STARS processes in a one sequential loop. In the linear embodiment each task, e.g. the TDMA, GPS and control processes, are executed in fast sequence one after another.

It is understood that aircraft power is operably connected to the STARS system 10. This includes normal aircraft power at 115 VAC 400 Hz and +28 VDC and emergency aircraft back-up power from the aircraft batteries. Internal STARS battery power may be used for long term variable storage and for emergency beacon power.

Figure 3:
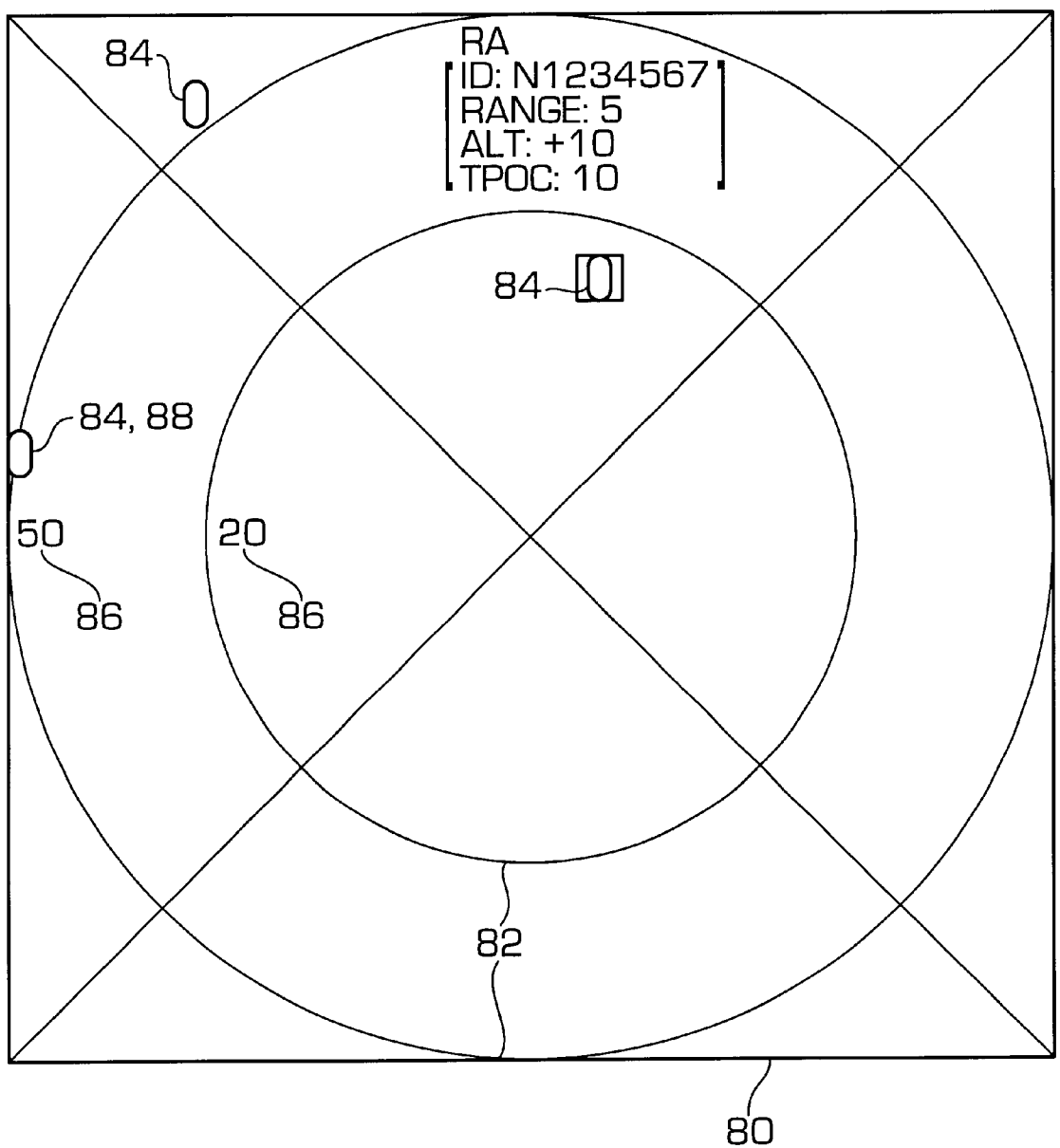
FIG. 3 illustrates the relative display mode format for the display unit of the improved automatic collision avoidance system of FIGS. 1 and 2.

FIG. 3 shows the display 74 in the relative bearing mode 80. The relative bearing mode 80 displays the relative bearing of intruder aircraft within the STARS 10 tracking range. The relative bearing mode 80 is calibrated with concentric circles 82 representing the range in nautical miles to the intruders representation 84. It is understood that the calibrated marking 86 may change depending on the STARS range mode, discussed below. Intruders that are beyond the calibrated range display are represented in the relative bearing mode 80 as intruders at the very edge of the display 88. The display 74 is preferably a color display capable of sufficiently high resolution to display aircraft in a relative bearing mode 80 as shown in FIG. 3.

Figure 4:
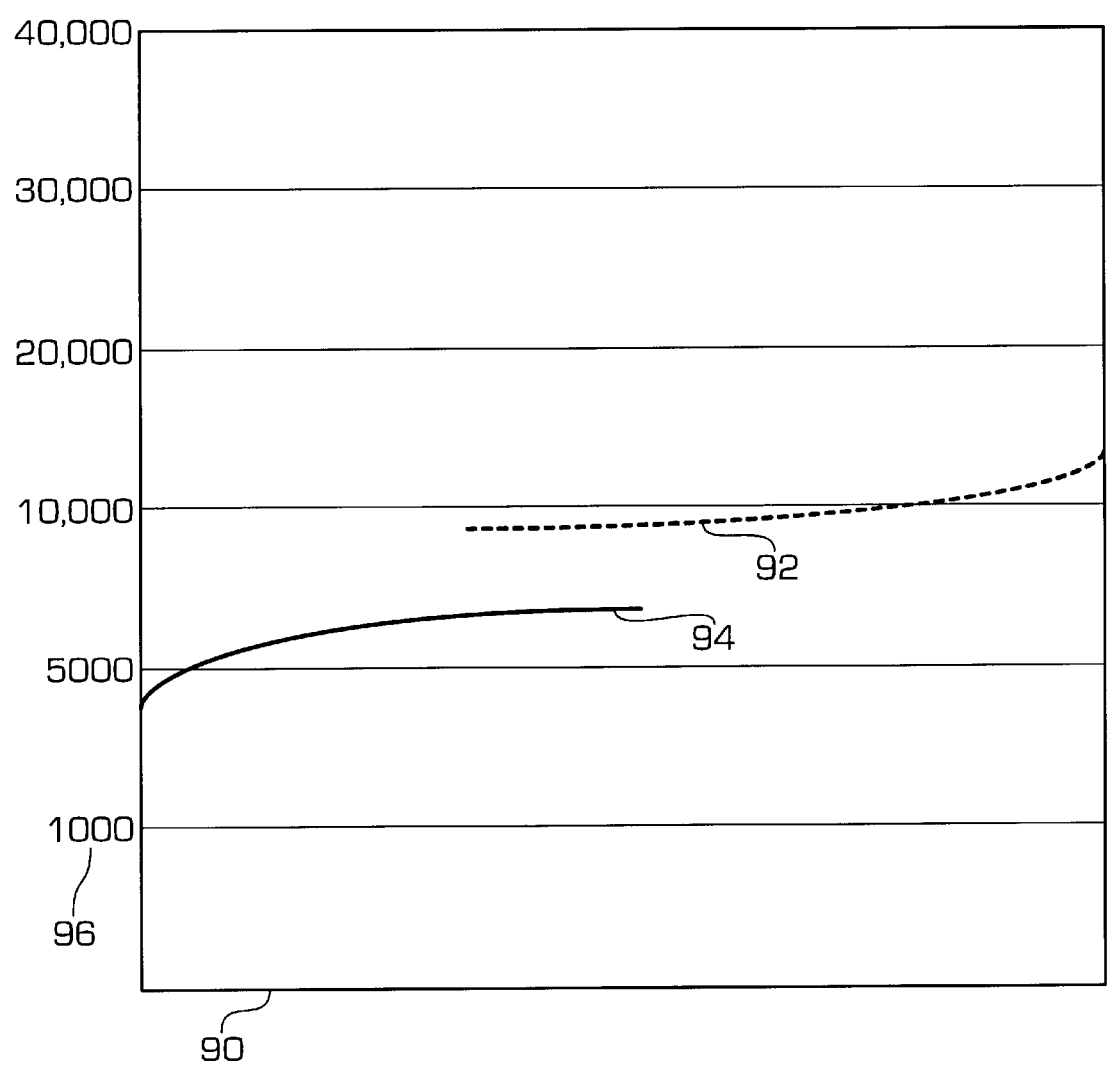
FIG. 4 illustrates the pseudo three dimensional display mode format for the display unit of the improved automatic collision avoidance system of FIGS. 1 and 2.

FIG. 4 shows the three dimensional altitude and bearing mode 90 on the display unit 74. The three dimensional mode 90 shows the three dimensional track for one's own aircraft representation 92 and intruder aircraft representations 94. The vertical index 96 is calibrated in feet to show the aircraft altitude. The horizontal index 98 is calibrated to show the range in nautical miles.

Figure 5:
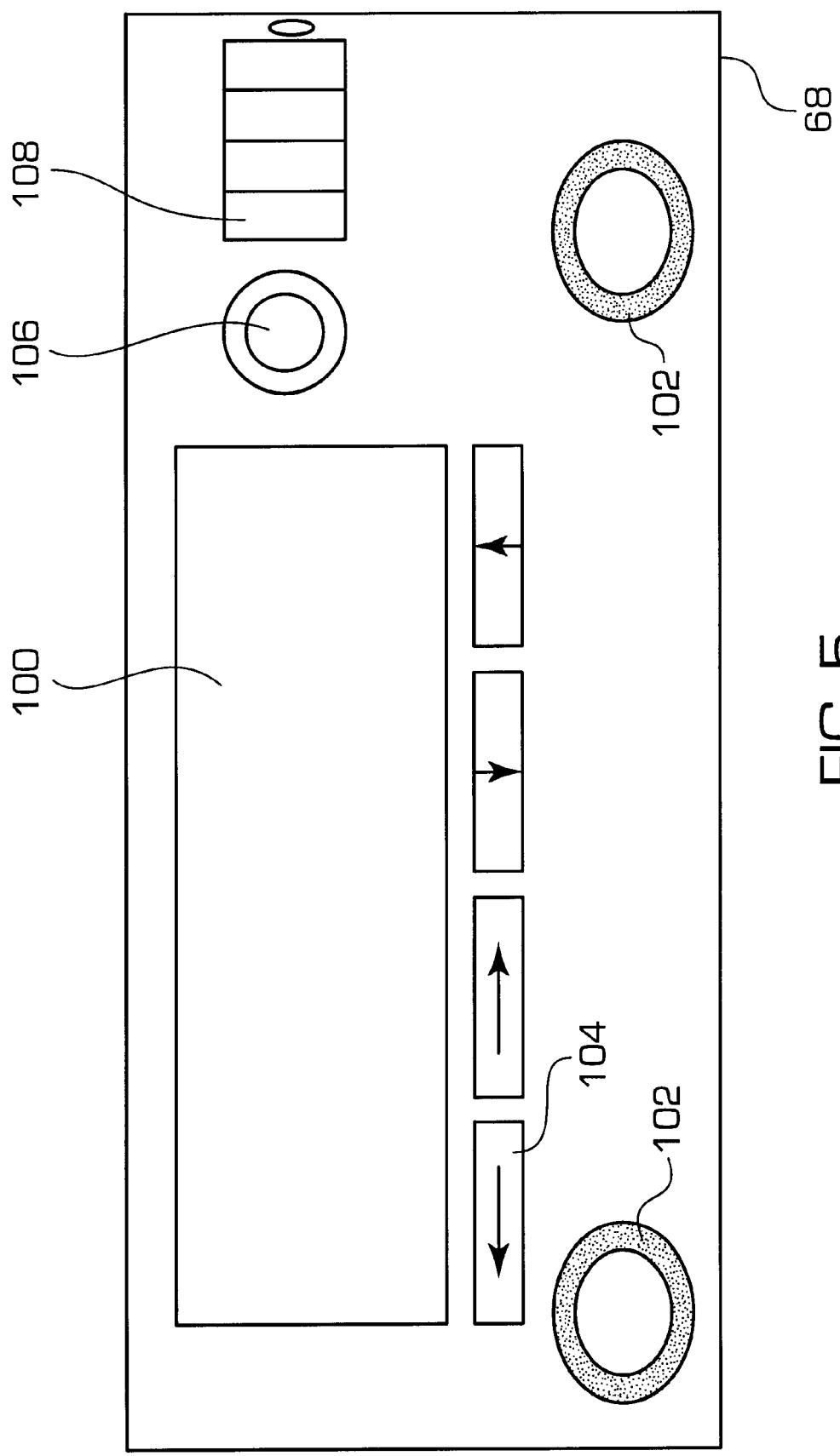
FIG. 5 illustrates the control panel for the control unit of the improved automatic collision avoidance system of FIG. 1 and 2.

FIG. 5 shows the STARS 10 control unit 68. The control unit 68 is the user interface for the STARS 10. In the preferred embodiment the control unit 68 is mounted in the aircraft front instrument panel just below the display unit 74. The control unit 68 physical dimensions in the preferred embodiment allows the control unit 68 to fit into a standard aircraft instrument hole. The control unit comprises: alphanumeric display 100; control knobs 102; buttons 104; control knob 106; and numeric display 108. The knob 106 selects the altitude window that is displayed in numeric display 108.

The altitude window data is used when a STARS extrapolates the track of the host aircraft and any intruder aircraft. Thus, the altitude window information may be used to create more accurate predictions of aircraft tracks. More accurate aircraft track predictions will reduce the number of false collision alarms created by more simplistic track prediction methods such as the TCAS "tau" calculation. The altitude window is the pilot's intended level off altitude. For example, if an aircraft pilot is taking off from an airport and the pilot intends to maintain a standard climb rate and level off at 12,000 feet then the pilot may select with knob 106 the level off altitude, e.g. 12,000 feet. The STARS 10 transmits the altitude window data in the regular STARS 10 TDMA transmission discussed below.

Figure 6:
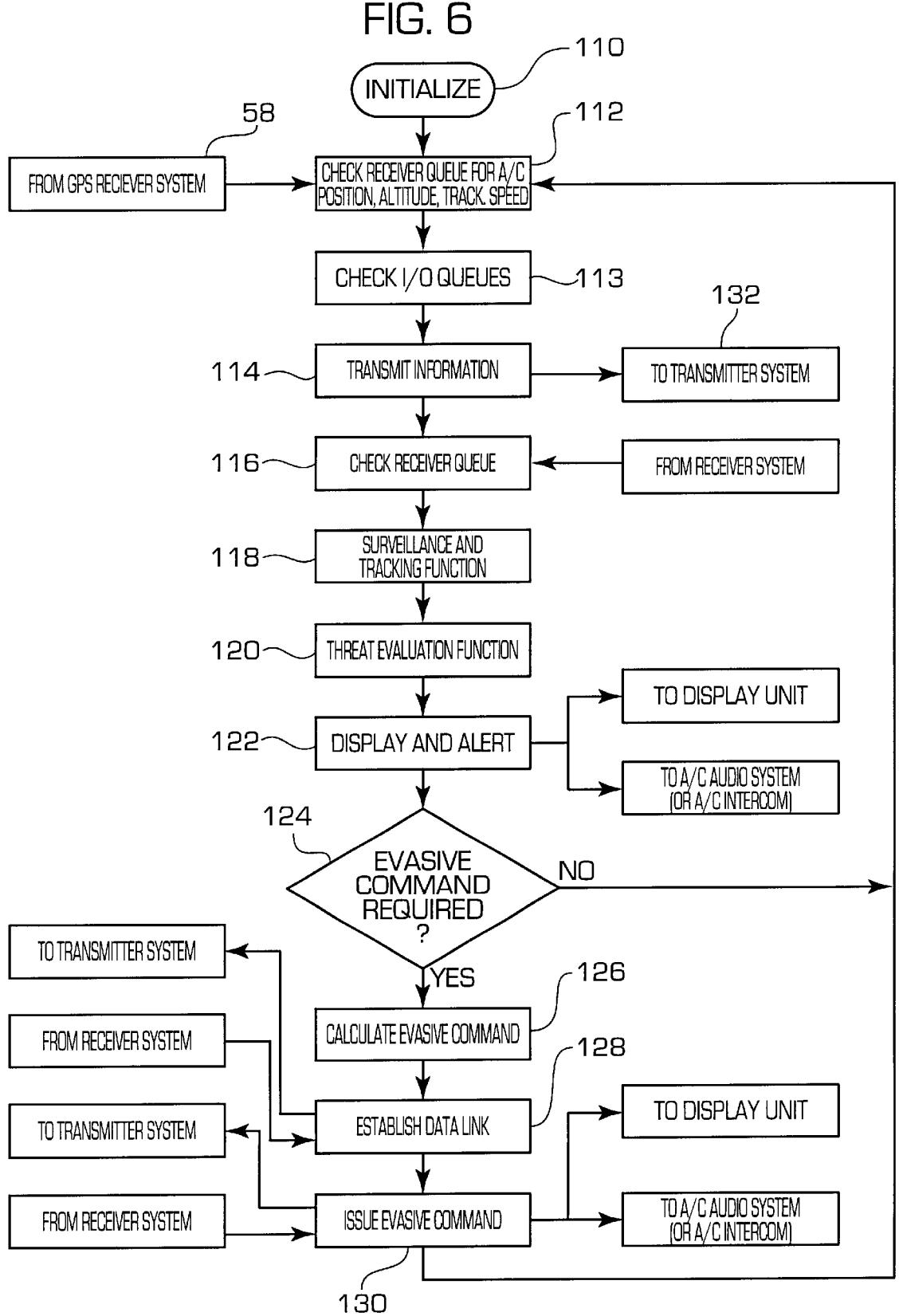
FIG. 6 is a schematic diagram illustrating a set of steps to operate the improved automatic collision avoidance system illustrated in FIGS. 1 and 2.

FIG. 6 illustrates the STARS 10 control program sequence. The STARS 10 control program sequence is a continues loop comprising the following steps: STARS initialization 110, read GPS receiver queue 112, read I/O queue and control switches 113, transmit information 114, read receiver queue 116, surveillance and tracking function 118, threat evaluation function 120, display and alert function 112; determination of whether an evasive command is required 124; calculation of an evasive command 126; establishing a data link 128; and issuing the evasive command 130. The initialization step 110 contains the sequence of steps necessary to initialize the STARS 10. The initialization step 110 includes placing the STARS processor 66, internal registers, I/O units 72, GPS receiver processor 58, display unit 74, and control unit 68 to a known predetermined initialization state. The initialization step 110, in addition, executes a power on self test routine to test the STARS 10, peripheral I/O connections 72, the GPS receiver 56, and GPS processor 58, modem 60, and transceiver 62. If the STARS 10 passes the built in test routine the initialization step 110 allows the control program sequence to advance to step 112. If the STARS 10 fails the built in test then the initialization step 110 causes a diagnostic code that describes which STARS 10 component failed to be displayed on the STARS alpha numeric display 100 and halts further control program execution.

The read GPS receiver queue step 112 in the preferred embodiment may check a processor register for information from the GPS receiver subsystem. The information from the GPS receiver subsystem, i.e. the GPS receiver 56 and GPS processor 58, is the aircraft position, altitude, and track in digital data form is automatically sent to the STARS computer 66. In the preferred embodiment the STARS GPS receiver subsystem executes the GPS program sequence separate and apart from the STARS control program. Thus, the receiver queue is a set of data storage registers contained in the STARS computer 66 interface to the STARS GPS processor 58. The receiver queue latches the information from the GPS processor 58 and serves as a data buffer between the GPS processor 58 and the STARS computer 66. The STARS control process at the read receiver queue step 112 moves the data from the receiver queue to an internal STARS computer 66 data storage register. This empties the receiver queue data registers and readies the data registers for new information. The STARS control process can manipulate and use the aircraft position, altitude, and track data as necessary to perform the STARS 10 functions in the STARS computer 66 internal registers. The use and manipulation of the positional and tracking data are described in substantive detail below.

The STARS control program advances to the read I/O queue and control switches step 113. The STARS computer 66 checks the status of the I/O control unit 72 for data. It is understood that temporary data storage and I/O status registers are used in the STARS computer 66 to connect to the I/O control unit 72. The temporary data storage and I/O registers buffer data and facilitate communications between the STARS processor 66 and the I/O control unit 72. The I/O status register may indicate which data register(s) contains new and valid data. For example, if the STARS 10 is connected to another aircraft system such as the radio altimeter, the radio altimeter is connected to the STARS with the I/O control unit 72. The I/O control unit 72 latches the digital data from the radio altimeter into an I/O storage register. The I/O unit then sets a bit in the I/O status register to indicate that digital data from the radio altimeter has been received. When the STARS control process reaches the step 113, the control process reads and decodes the I/O status word. The decoded status word indicates whether data is present from the radio altimeter. The control process may move the data from the I/O control unit 72 data register to an internal storage register or to the storage unit 70. The STARS control process 113 may set or clear the I/O status word to represent that the data has been moved from the I/O control 72 storage register and that the storage register is now free to receive more data. Thus, the I/O control unit 72 data and I/O status registers serve as buffers between the fast execution of the STARS control program and relatively slow speed of STARS 10 I/O communications. Likewise, the STARS computer 66, at step 113, scans the control unit 68 switches.

The STARS control program now advances to the transmit information step 114. In the preferred embodiment, the transmit information step 114 comprises the sequence of instructions necessary to format a STARS 10 TDMA message and transfer the message to the STARS transmitter system 132. The STARS transmitter system comprises the modem 60 and transceiver 62. The STARS message comprises a block of digital data with the following encoded data fields: a synchronizing pattern; the sending aircraft identification; the receiving aircraft identification; a control word; longitude data; latitude data; altitude data; velocity x; velocity y; velocity z; altitude window; user programmable telemetry; a status message; and a cyclic redundancy check (CRC) field. The construction of the STARS message block is discussed in substantive detail below.

The STARS control program now advances to read the receiver queue 116. The read receiver queue step 116 in the preferred embodiment may check a processor register for information from the transceiver 62 and modem 60. The information from the transceiver 62 and modem 60 is STARS message blocks from other STARS equipped vehicles in receiving range. As discussed in substantive detail below, the transceiver 62 and modem 60 executes the tasks necessary to receive and transmit messages with other STARS separate and apart from the STARS control program. Thus, the transceiver queue is a set of data storage registers contained in the STARS computer 66 interface to the STARS modem 60. The transceiver queue latches the information from the modem 60 and serves as a data buffer between the modem 60 and the STARS computer 66. The STARS control process at the read receiver queue step 116 moves the data from the receiver queue to an internal STARS computer 66 data storage register. This empties the receiver queue data registers and readies the data registers for new information. The STARS control process can manipulate and use the messages from other STARS as necessary to perform the STARS 10 functions in the STARS computer 66 internal registers.

The surveillance and tracking function 118, discussed in substantive detail below, processes the data blocks received in step 116. This includes determining the range of any intruder aircraft, determining the relative bearing, determining the relative altitude, calculating the closing rate, deciding whether the intruder should be put into the tracking mode, and calculating an estimate miss distance.

The threat evaluation function 120, discussed in substantive detail below, divides all intruder aircraft into a threat classification. The threat classifications are non-threat, proximity, traffic advisory, and resolution advisory threat.

The display and alert function 122, discussed in substantive detail below, generates the display of the intruder aircraft for the display unit 74 and generates the pre-programmed audio alerts with the audio interface 76.

The determination whether an evasive command is required at step 124 is based on a list of pre-determined parameters discussed in substantive detail below. Generally, the altitude of the aircraft and the calculated miss distance will determine whether the STARS will issue an evasive command.

The calculation of an evasive command 126, discussed in substantive detail below, generally depends on which aircraft is at the higher altitude and aircraft performance factors.

The establishment of a data link 126, discussed in substantive detail below, is used to coordinate evasive maneuvers between aircraft. The coordination of evasive maneuvers assures that aircraft on a collision course will increase their separation by the execution of a coordinated evasive maneuver.

The issuance of the evasive command 130, discussed in greater detail below, is the alert and display of the evasive maneuver to the pilot. The evasive command issues after the coordination of the evasive command 128.

Figure 7:
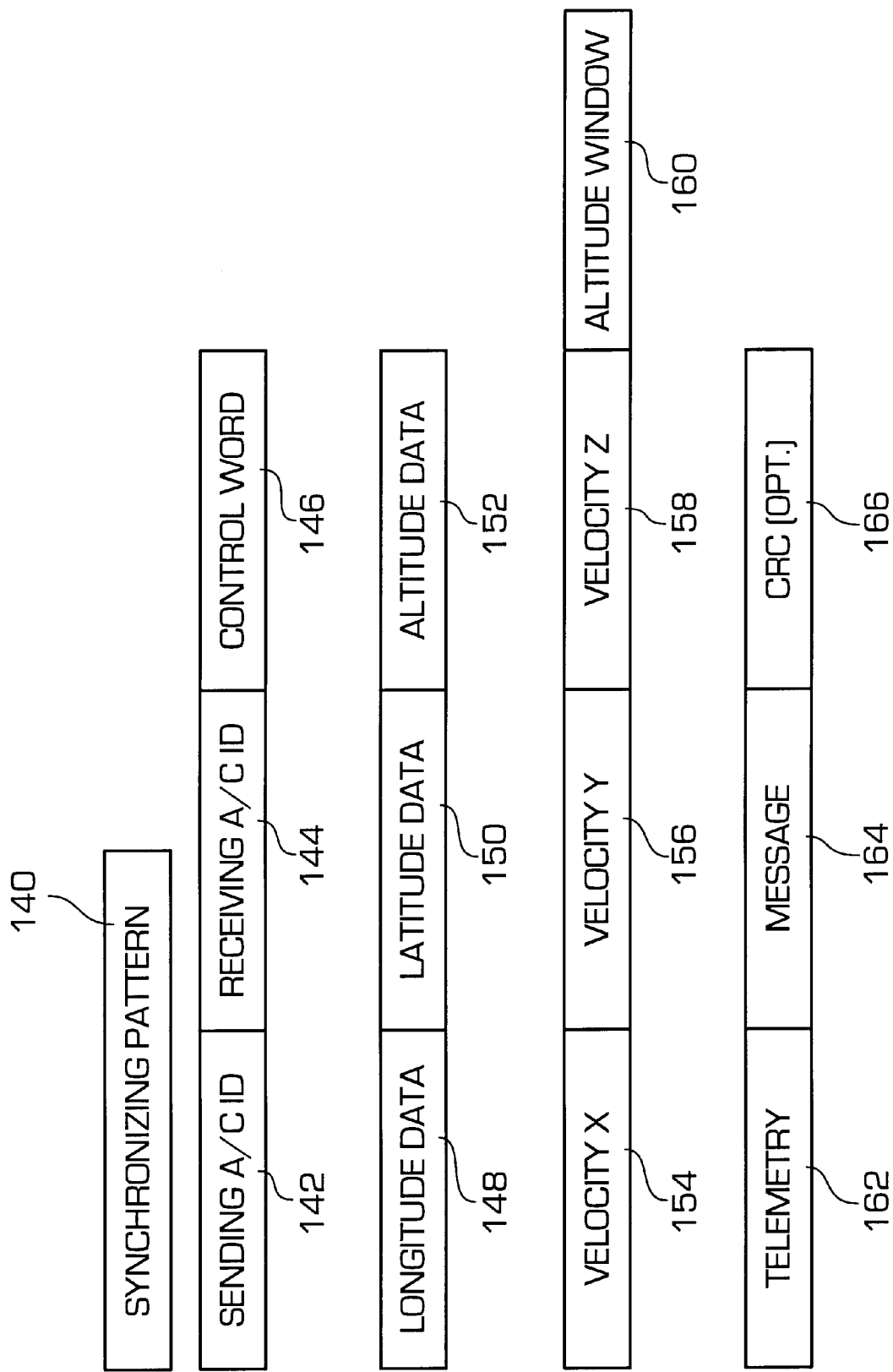
FIG. 7 is a diagram illustrating the data message block used to communicate between an improved automatic collision avoidance system and another improved automatic collision avoidance system.

FIG. 7 illustrates the STARS data message block sent and received by the STARS control program shown in FIG. 6. The STARS data block comprises a synchronizing pattern 140, a sending aircraft identification 142, a receiving aircraft identification 144, a control word 146, longitude data 148, latitude data 150, altitude data 152, velocity X 154, velocity Y 156, velocity Z 158, altitude window 160, telemetry 162, a message 164 and a CRC character 166. The synchronizing pattern 140 is a predetermined synchronization pattern that indicates the start of STARS data block. The synchronization pattern is the same for all STARS data blocks, therefore, when a STARS transceiver recognizes the synchronization pattern it synchronizes the receiver queue with the start of the STARS message. The aircraft ID field 142 is a digital word that encodes the full aircraft registration number of the transmitter STARS aircraft. Block 142, in addition, contains encoded information about the aircraft model. For example, N1234567B727 represents the registration number of an aircraft, e.g. N1234567, and that the aircraft is a Boeing 727, e.g. B727. The aircraft ID receiving field 144 is the registration number for a targeted intruder aircraft. This field 144 is used to designate whether the data block is a general STARS location beacon message or a STARS data link message. The data link message is used to coordinate resolution advisory commands between aircraft. The data link block contains information for communication between two particular aircraft, whereas, a general STARS beacon message is directed to all aircraft and ground sites within receiving range. The control word 146 is used in conjunction with the aircraft receiving ID 144 to coordinate the data link and resolution advisory. The control word 146 also identifies whether the STARS message is a general poll, data link, or an ATC message. The control word 146 can also be used to prioritize a message or encode emergency indications. The longitude data field 148 is data that represents the GPS longitude of the aircraft. The latitude data field 150 is data that represents the GPS latitude of the aircraft. The altitude data field 152 is data that represents the GPS altitude of the aircraft. It is important to note that the longitude, latitude, and altitude data is from the GPS receiver system and not from a solely internal aircraft reference such as the inertial navigation system (INS) or a pressure altimeter. A GPS commercial grade receiver may have resolution errors in it's positioning calculations. These resolution errors, however, are inherent in the GPS methodology and therefore are common to all commercial grade GPS receivers operating in the same geographic area. Since all STARS GPS receivers have the same commercial grade resolution error, when the position and tracking information are used to calculate relative distance between aircraft the resolution error cancels. This makes the STARS 10 local GPS beacon method of the present invention extremely accurate at determining the relative location and altitude of intruder aircraft. The velocity X 154, velocity Y 156, and velocity Z 158 data fields together represent the velocity vector of the aircraft. The velocity vector is calculated by continuously measuring the distance between GPS positions divided by the time the aircraft took to cover the distance. The altitude window 160 represents the "fly to" altitude of the aircraft. The altitude window 160 data is input from the STARS control panel 68. As pointed out earlier, a source of numerous false alarms in present anticollision systems arises from a condition where one aircraft is taking off and climbing and another aircraft is descending. The alarm is false because the climbing aircraft may level out at a predetermined altitude and, therefore, present no collision danger. The present invention overcomes this limitation by allowing the pilot to designate in advance the predetermined level off altitude on the STARS control panel 68. A STARS transmits this information in the altitude window field 160. STARS processors use the altitude window 160 information to determine the extrapolated trajectory of aircraft and whether a resolution advisory should be generated. The telemetry field 162 represents data that encodes selected aircraft telemetry. For example, whether the landing gear up or down may be encoded in this field. It is within the scope of the present invention to send and receive other instrumentation or other aircraft system data within the telemetry data field. The message field 164 represents data that encodes messages and is otherwise reserved as a maintenance channel and for future use. It is understood that a data block (CRC) 166 can be included with the data block transmission. A CRC check field assures, to a high degree of probability, that the data block is received without bit errors. Thus, data blocks with bad CRC fields can be rejected as blocks having bit error(s). It is also within the scope of the present invention that data coding, such as, forward error correction (FEC) and other noise immunity techniques can be employed to improve the effective signal to noise ratio of the STARS signal. For example, the Reed-Solomon FEC algorithm can be used to make a more robust data sequence.

Figure 8:
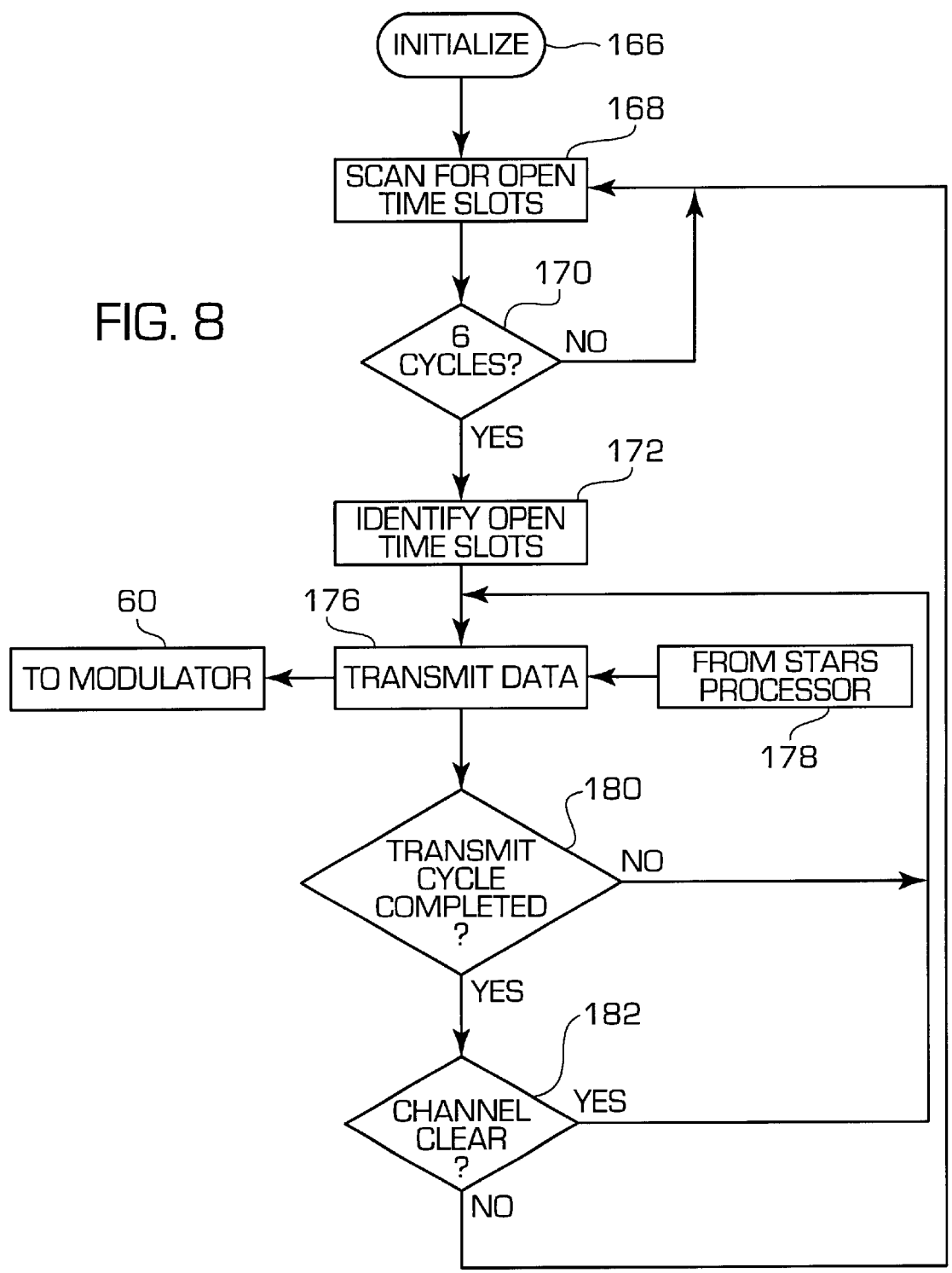
FIG. 8 illustrates a sequence of steps which may be performed to operate the multipoint direct radio protocol used in the improved automatic collision avoidance system.

FIG. 8 illustrates the TDMA protocol sequence. The STARS 10 at power on and when placed into active beacon mode will initialize the transmission protocol 166 by setting data registers and protocol procedures to a predetermined initial state. In the preferred embodiment, the TDMA protocol is used to synchronize STARS beacon and data link signals. It is understood to those in the art, however, that other suitable multiple access protocols are within the scope of the present invention. The TDMA protocol initially scans the beacon frequency for open time slots 168. After listening for six TDMA cycles 170 the protocol identifies a time slot hat has been open for six consecutive cycles 172. The TDMA protocol seizes the time slot by transmitting a data block shown in FIG. 7 to the modem 60 at the precise time slot. It is understood that a FEC coder/decoder maybe inserted at this point. The modem 60 modulates the beacon frequency carrier for the transceiver 62 to broadcast through the beacon antenna 32. The TDMA protocol will continue to beacon the data block at it's seized TDMA slot for a randomized number from three to nine TDMA cycles 180. It is understood that the carrier frequency should be sufficiently high to support multiple TDMA time slots. In the preferred embodiment the STARS 10 transmits on the TCAS L-Band interrogator SHF radio frequency, however, a laser, infrared, UHF or VHF carrier is within the scope of the invention. When the transmission cycle is compete 180, the TDMA protocol listens for whether its seized TDMA slot is clear 182. If the slot is clear the protocol keeps the slot and returns to the beacon mode 176. If the slot is not clear the TDMA protocol returns to the scan mode 168 and begins to scan for another free slot. Thus, the TDMA protocol synchronizes into the TDMA slot by finding a clear TDMA channel and transmitting it's data block in that slot. During transmission the transceiver 62 blanks the receiver input to prevent receiver overload. When the TDMA protocol and transceiver 62 stops transmission on the seized time slot it immediately returns to the listen mode to receive beacons from other STARS systems. When the TDMA protocol decodes a beacon on another slot it places the received data block into the receiver queue 116. It is understood that the transmission time slot is relatively small when compared to the total number of available slots. Thus, the receiver queue 116 is understood to be large enough to accommodate a plurality of incoming messages. It is also understood that the TDMA protocol requires precise timing to obtain the maximum number of time slots available at any given frequency and burst size. The GPS precision clock provides an excellent source of precision timing signals to maintain a single timing source for all STARS within a given geographic area and thus maximize the TDMA synchronization between STARS.

Figure 9:
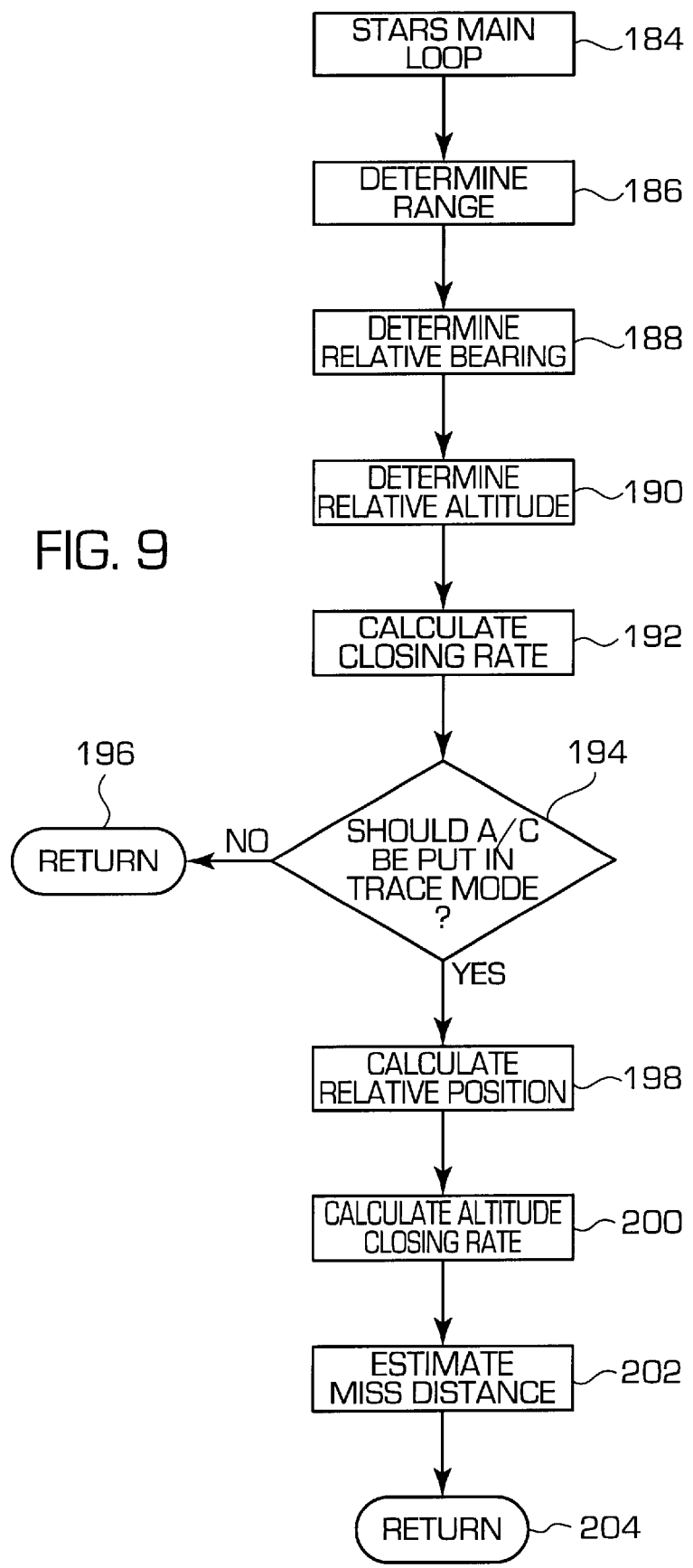
FIG. 9 illustrates a sequence of steps which may be performed to operate the surveillance and tracking function to operate the improved automatic collision avoidance system of FIG. 1 and 2 by performing the steps of the function block shown in FIG. 6.

FIG. 9 illustrates the sequence of instructions required to execute the surveillance and tracking function shown in FIG. 6. The surveillance and tracking function 118 comprises the sequence of instruction necessary to: determine the range to all aircraft in the STARS receiving range 186, determine the relative bearing to all intruders 188, determine the relative altitude of intruders 190, calculate aircraft closing rates 192, determine whether the aircraft should be placed into the track mode 194; calculate the relative position 198, calculate the altitude closing rate 200, and estimate the miss distance 202. The surveillance and tracking function 118 function first determines the range 186 of intruding aircraft. Range is determined by calculating the length of the vector between the intruder aircraft position and altitude and one's own aircraft position and altitude. The function next calculates the relative bearing 188 of the intruder aircraft. The relative bearing is calculated by determining the angle of the intruder aircraft relative to the baseline zero degree angle directly ahead of one's own aircraft. This calculation is performed by determining the X and Y displacement from one's own location to the intruder aircraft. The displacement is adjusted for the display units 74 distance calibration 86 and is used to display the intruder aircraft in the relative display mode 80. The function 118 next calculates the relative altitude between one's own aircraft and an intruder aircraft at step 190. The relative altitude 190 may be calculated by using the Z component of the vector distance between one's own aircraft and the intruder aircraft. The function 118 next calculates the closing rate of the intruder aircraft at step 192. The closing rate is determined by subtracting the velocity vector of one's own aircraft from the intruder aircraft. Thus, aircraft velocity vectors that are pointed at each other will have an additive velocity effect. While two velocity vectors pointed in the same direction will have a set off effect on the closing rate. The function 118 next determines whether the intruder aircraft should be put into the track mode at step 194. This determination is made by comparing the aircraft altitude, bearing, and closure rate to predetermined parameters. In the preferred embodiment the predetermined parameters are whether the intruder is within 80 miles of one's own aircraft. If the intruder aircraft falls within the predetermined parameters the intruder aircraft is put into track mode and the function proceeds to step 198. If the intruder aircraft falls outside of the predetermined track thresholds at step 194 then the function 118 returns to the main loop 196. If the intruder is put into track mode then the function 118 calculates the relative position of the intruder aircraft at step 198. The relative position of an intruder aircraft is the X and Y vector displacement between the intruder aircraft and one's own aircraft. The function 118 then calculates the altitude closing rate at step 200. The altitude closing rate is the value of the Z component of the difference between one's own aircraft velocity vector and the intruders velocity vector. The function 118 next estimates the miss distance between an intruder aircraft and one's own aircraft at step 202. This may be performed by step 202: extrapolating the trajectory of the intruder aircraft from the intruder aircraft position, velocity vector, and altitude window data; extrapolating one's own aircraft trajectory from one's own position, velocity vector, and altitude window data; and using the extrapolated trajectories to determine the closest distance between the two aircraft trajectories by iteratively calculating the distance from a point on one's own track to each point on the intruders track. The surveillance and tracking function 118 then returns at step 204 to the STARS control program shown in FIG. 6. The STARS control program then calls the threat evaluation function 120.

Figure 10:
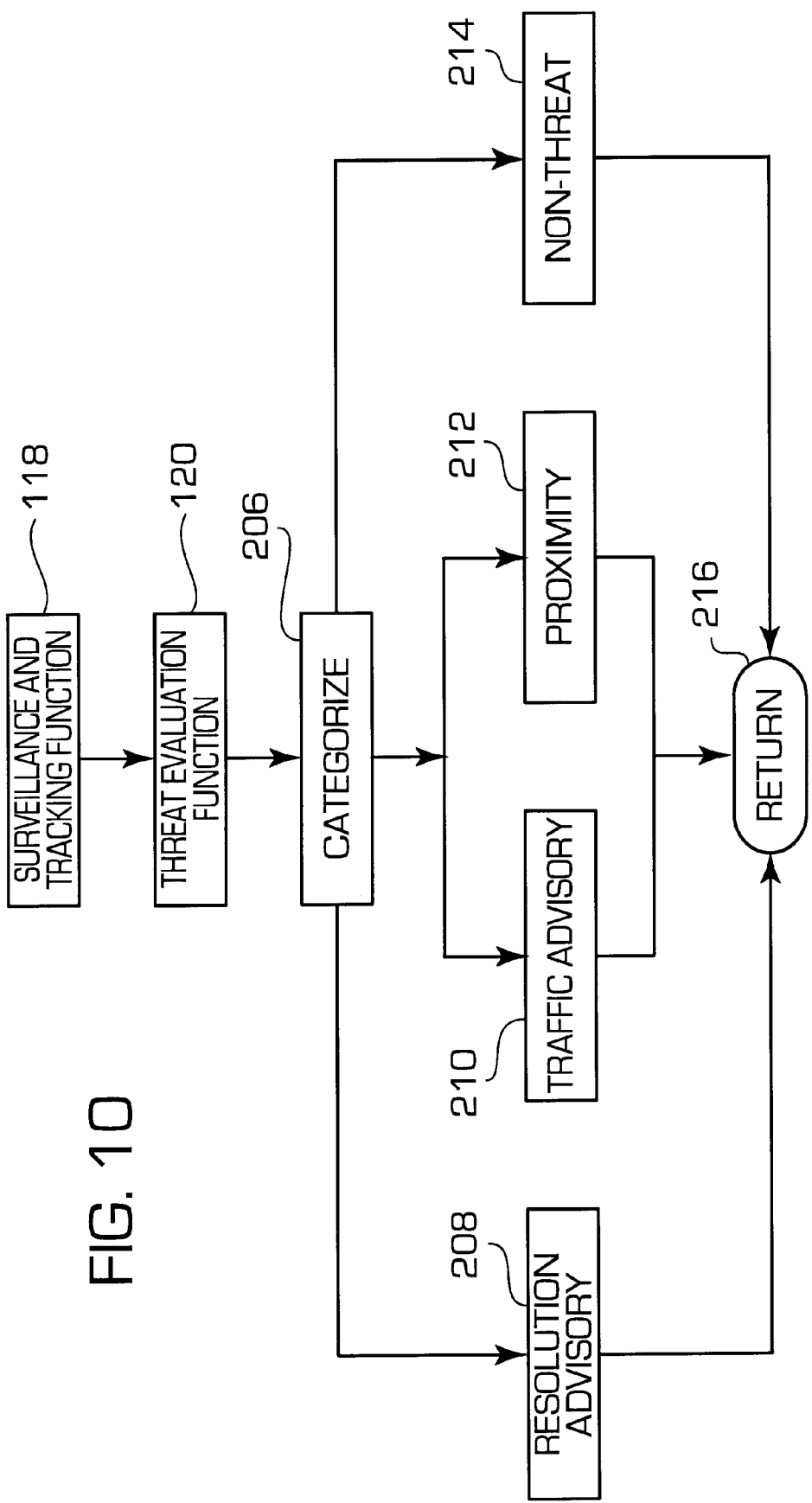
FIG. 10 illustrates a sequence of steps which may be performed to operate the threat potential and evaluation function to operate the improved automatic collision avoidance system of FIG. 1 and 2 by performing the steps of the function block shown in FIG. 6.

Turning now to FIG. 10, data calculated in the surveillance and tracking function 118 is passed to the threat evaluation function 120. Depending on the altitude, position, closure rates, and velocity vector and the STARS sensitivity mode, discussed below, the threat potential and evaluation function 120 categorizes at step 206 intruder aircraft as either a resolution advisory threat 208, a traffic advisory 210, proximity 212, or a non-threat 214. If it is determined that the intruder aircraft is a non-threat 214 then the system returns from the function at step 216. If it is determined that the intruder is outside the traffic advisory parameters but within the predetermined proximity parameters then the intruder is classified as a proximity threat 212. The function 212 flags the intruder aircraft for a proximity alert on the display. If the intruder aircraft is within the traffic advisory parameters but outside the resolution advisory parameters then the function 210 will flag the intruder aircraft for a traffic advisory display. If the intruder aircraft is within the resolution advisory parameters then the intruder aircraft is flagged as a resolution advisory. The categorized intruder aircraft are then passed to the display and alert routine 122. It is understood that all intruder aircraft are tracked simultaneously and that the data may be stored in an array of data organized by the intruder aircraft identification number (ID).

Figure 11:
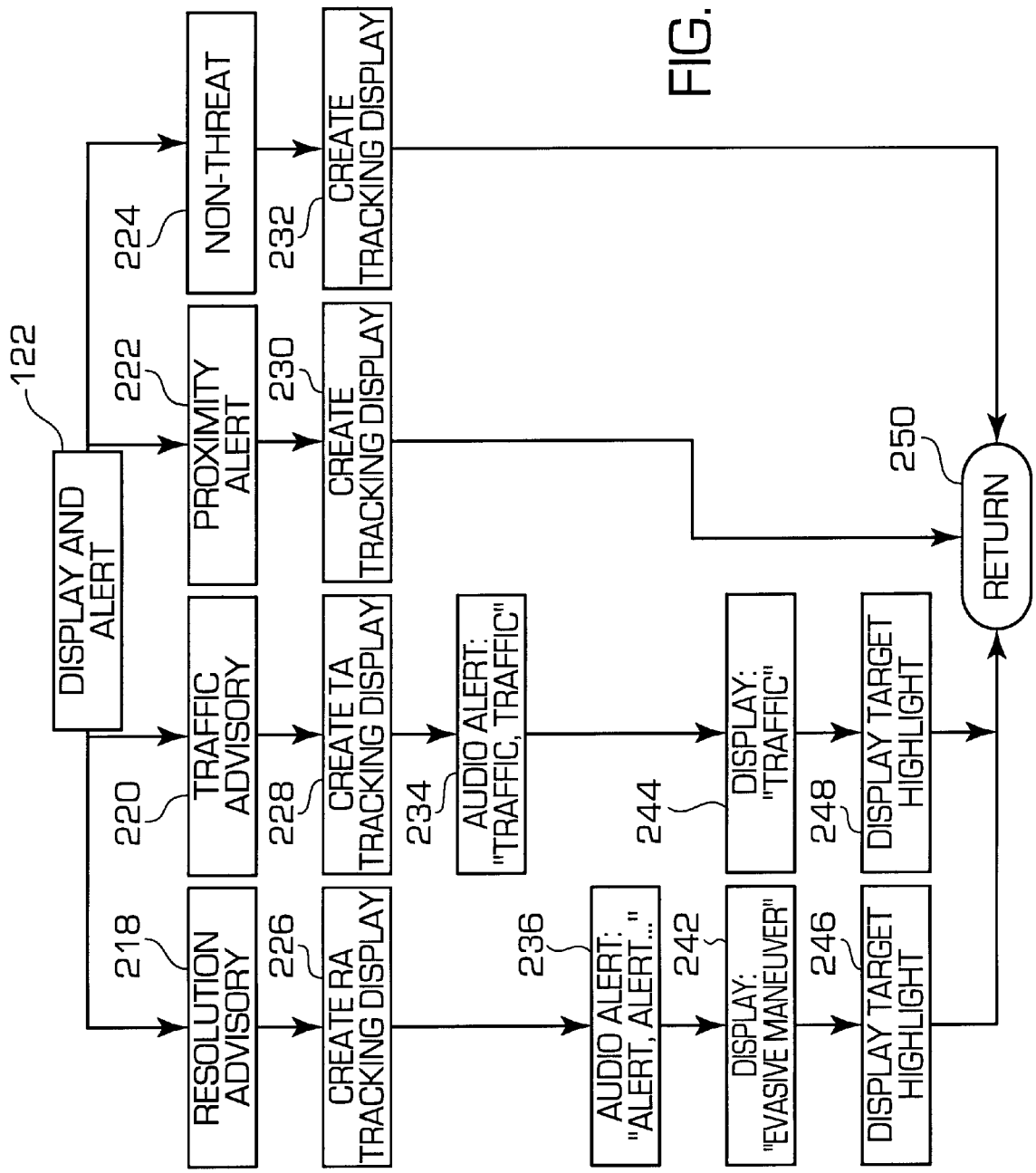
FIG. 11 illustrates a sequence of steps which may be performed by the traffic advisory display function to operate the improved automatic collision avoidance system of FIG. 1 and 2 by performing the steps of the function block shown in FIG. 6.

FIG. 11 illustrates the sequence of steps necessary to perform the display and alert function 122 shown in FIG. 6. The display and alert function 122 comprises the following steps: create a resolution advisory (RA) tracking display 226; create a traffic alert (TA) tracking display 228; create a tracking display for proximity alerts 230; create a tracking display for non-threats 232; create an audio alert for a resolution advisory 236; create an audio alert for a traffic advisory 234; create a display for an "evasive maneuver" 242; create a display for "traffic" 244; create a display to highlight an RA target 246; and create a display to highlight a TA target 248. The display and alert function 122 uses the classification from the threat evaluation function 120 to divide intruder aircraft records into the resolution advisory 218; traffic advisory 220, proximity alert 222, or non-threat 224 categories. If the intruder aircraft is classified as an resolution advisory 218 the function 122 creates an RA tracking display 226, creates and audio alert 236, creates a display to display "evasive maneuver" 242 and displays the intruder target as a highlighted icon 246. The function to create an RA tracking display 226 reads the intruder aircraft ID, range, altitude, and time to point of contact (TPOC) from the intruder aircraft data record. Function 226 formats and sends this data to the STARS display unit 74. The audio alert function 236 creates a synthetic voice stating "alert, alert . . . " and sends this information to the STARS audio interface 76. The function 242 creates and an "evasive maneuver" display for the STARS display unit 74. The "evasive maneuver" display appears as flashing text across the bottom of the STARS display 74 and indicates that an evasive maneuver is imminent. The display target highlight function 246 displays the intruder aircraft representation on the display unit 74 as bright and flashing. If the intruder aircraft is classified as a traffic advisory 220 the display and alert function 122 executes the following steps: create a TA tracking display 228, create and audio alert 234, create a display "traffic" 244, and display a target highlight 248. The create TA tracking display 228 function reads the intruder aircraft ID, range, altitude, and TPOC from the intruder aircraft data record. The function 228 formats and sends this data to the STARS display unit 74. The traffic advisory creates a synthetic voice audio alert to announce "traffic, traffic, . . . " over the aircraft intercom system. The audio alert 234 function sends the synthetic voice commands to the audio interface 76. The display function 244 creates a "traffic" display at the bottom of the STARS display unit 74. If the intruder aircraft is classified as a proximity alert 222 function 230 creates a tracking display. The function 230 creates a tracking display of the intruder aircraft for display on the STARS display unit 74. The display is a dot that represents the relative bearing and distance to the intruder aircraft. If the display and alert function 122 classifies the intruder aircraft as a non-threat 224 then the function creates a tracking display for a non-threat aircraft at step 232. The tracking display 232 step creates a dot that represents the intruder aircraft at the edge of the STARS display unit 74. The dot represents the relative bearing to the intruder aircraft and that the intruder aircraft is outside the display unit 74 calibrated display range. The function 122 returns to the control program illustrated in FIG. 6 at step 250.

Figure 12:
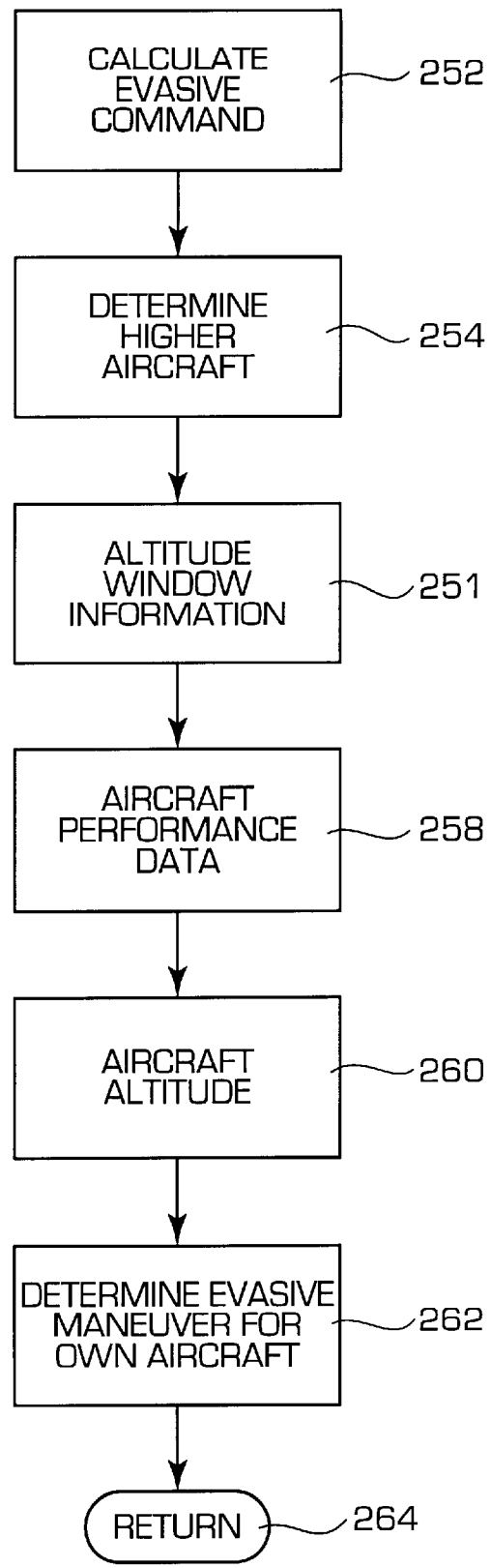
FIG. 12 illustrates a sequence of steps which may be performed by the evasive command generator function to operate the improved automatic collision avoidance system of FIG. 1 and 2 by performing the steps of the function block shown in FIG. 6.

FIG. 12 illustrates the steps necessary to calculate an evasive command as shown in FIG. 6 step 126. The calculate evasive command function 126 comprises the following: determining if the intruder aircraft is higher 254, reading the altitude window information 256, determining aircraft performance data 258; calculating aircraft altitude 260, and determining an evasive maneuver for one's own aircraft 262. The calculate evasive command function 126 calculates an initial evasive command by determining which aircraft is at a higher GPS altitude at step 254. The calculate evasive command function at step 254 tentatively determines that the higher aircraft will be issued the climb command and the lower aircraft will coordinate with a descend command. The function 126 then retrieves the altitude window information at step 256, the aircraft performance data at step 258 and the aircraft altitude at step 260 from the STARS 10 memory and storage unit 70. The function 126 determines at step 262 using these factors and a set of predetermined parameters whether the initial evasive maneuver calculated in step 254 is permissible. If the initial evasive maneuver calculated at step 254 is permissible the evasive command function 126 returns with the initial evasive maneuver at step 264. If the function at step 262 determines that the initial evasive maneuver calculated at step 254 is impermissible then step 262 determines a permissible evasive maneuver. It is understood that the evasive maneuver generator will generate an evasive command that requires the least radical maneuver. For example, if two aircraft are at the same altitude but one aircraft is descending, the evasive command will allow the descending aircraft to keep descending and order the possibly lower aircraft to climb. The function 126 then returns with the permissible evasive maneuver calculated at step 262 at step 264.

Turning back to FIG. 6 the calculate evasive command function 126, shown in detail at FIG. 12, returns with an evasive command. The STARS control process shown in FIG. 6 advances to the establish data link step 128. The data link step 128 sends the evasive command generated for one's own aircraft to the intruder aircraft. This is accomplished by formatting a standard STARS data block, shown in FIG. 7, with the intruder aircraft ID in the receiving aircraft data field 144. More specifically, the establish data link function 128 builds a TDMA transmit block as follows: one's own aircraft ID is encoded in field 142; the receiver aircraft ID field 144 is programmed with the intruder aircraft ID, the control word 146 is encoded with a pattern that indicates an initial evasive maneuver data link command, fields 148, 150, and 152 are encoded with the respective longitude, latitude, and altitude data of one's own aircraft; the velocity vector fields 154, 156 and 158 are encoded with data that represents the evasive maneuver velocity vector calculated at step 126. This message is sent by the STARS control program to the STARS modem 60 for transmission by the transceiver 62.

STARS within receiving range receive the TDMA data link message sent at step 128. Receiving STARS, e.g. intruders, scan the receiving aircraft ID field 144 to determine if the message has a receiving aircraft ID 144 that matches it's own unique aircraft ID. If the IDs match, the STARS decodes the control word 146 and the evasive maneuver velocity vector encoded in fields 148, 150, and 152. The receiving STARS then creates an evasive maneuver that is opposite to the other aircraft's altitude change. For example, if one's own aircraft originally generates an evasive maneuver to climb then the opposite evasive maneuver generated by an intruder aircraft would be to descend. The receiving STARS builds a TDMA data reply block as follows: The sending aircraft ID field 142 is encoded with the intruder aircraft's ID; the receiver aircraft ID field 144 is programmed with the aircraft sending ID field decoded from the received data link block 142; the control word 146 is encoded with a pattern that represents an evasive maneuver data link acknowledgment; fields 148, 150, and 152 are encoded with the positional data; field 154, 156 and 158 are encoded with data that represents an evasive maneuver velocity vector. The receiving STARS transmits this "acknowledgment" message.

The originating STARS receives the acknowledgment message and the opposite evasive maneuver from the receiving STARS, e.g. the intruder STARS. When the evasive maneuver originating aircraft receives the data link acknowledgment with an opposite maneuver the originating aircraft at step 128 creates and formats the evasive maneuver for display on the STARS display unit 74. The originating STARS also creates the appropriate audio message with the audio interface unit 76. A contrary maneuver from the intruder indicates that the evasive command was rejected and the data link originating aircraft should display an opposite maneuver. Appropriate evasive maneuver synthetic voice commands and corresponding display are as follows:

"CLIMB" "CLIMB", "DESCEND" "DESCEND"

"STOP CLIMB", "STOP CLIMB"

"STOP DESCENT", "STOP DESCENT"

"DO NOT CLIMB", "DO NOT CLIMB"

"DO NOT DESCEND", "DO NOT DESCEND"

If the STARS command is a reversal of a preceding command then the STARS uses a special reversal command notice. Reversal evasive commands can be generated in high traffic areas were repetitive evasive maneuvers are required between multiple aircraft to assure safe distance. Generally, reversal commands are created that could require the executing aircraft to sustain approximately +/–0.35 G. When a reversal vertical maneuver is required, one of the following appropriate evasive commands will be issued.

"CLIMB NOW", "CLIMB NOW"

"DESCEND NOW", "DESCEND NOW"

The STARS evasive command generator 126 operates in different modes for different altitudes. Lower layers have less sensitive RA and TA threshold levels to prevent unnecessary advisories in higher traffic density areas. These parameters can be delineated, however, it is understood that these parameters are subject to FAA regulatory approval and frequent changes are within the scope of the present invention. The sensitivity modes are:

Sensitivity Level 1:

Own aircraft is below 500 feet above programmed/selected reference altitude (P/S/REF/ALT). In this mode only TAs are generated and RAs are inhibited. A TA is generated if (1) the STARS calculates that at the current closing rate a safe miss distance of 1200 feet in relative GPS altitude between one's own aircraft and intruder aircraft will be violated in 20 seconds or less or (2) if the STARS determines that separation between one's own aircraft and intruder aircraft is less than 1200 feet in GPS Altitude.

Sensitivity Level 2

Own aircraft is between 500 feet above P/S/REF/ALT and 2500 feet above P/S/REF/ALT, in this mode TAs and RAs will be generated. A TA is generated if the STARS calculates that (1) at the current closing rate a safe miss distance of 1200 feet in relative GPS altitude between one's own aircraft and intruder aircraft will be violated in 35 seconds, (2) separation between one's own aircraft and intruder aircraft is less than 1200 feet in GPS altitude and less than 0.35 NM (2128 feet) in range. A RA is generated if the STARS calculates that (1) at the current rate of closure a safe miss distance between one's own aircraft and intruder aircraft will be violated in 20 seconds or less, and (2) the extrapolated aircraft tracks have a miss distance between 400 and 700 feet. A corrective (RA) evasive command will be generated if (1) the extrapolated aircraft tracks determine an aircraft miss distance is less than 400 feet and (2) separation between one's own aircraft and intruder aircraft is less than 750 feet in altitude and less than 0.35 NM (2128) in range.

Sensitive Level 3

Own aircraft altitude is above 2500 feet P/S//REF/ALT and below 10,000 feet above P/S/REF/ALT. In this mode TAs and RAs will be generated. A TA is generated if the STARS calculates that (1) at the current closing rate a safe miss distance of 1200 feet in relative GPS altitude between one's own aircraft and intruder aircraft will be violated in 40 seconds, (2) separation between one's own aircraft and intruder aircraft is less than 1200 feet in altitude and less than 0.55 NM (3344 feet) in range. A RA is generated if the STARS calculates that at the current closure rate a safe miss distance between one's own aircraft and intruder aircraft will be violated in 25 seconds. A preventative RA evasive command will be generated if the extrapolated miss distance is between 400 and 700 feet. A corrective (RA) evasive command will be generated if (1) the extrapolated miss distance is less than 400 feet or (2) separation between own aircraft and intruder aircraft is less than 750 feet in altitude and less than 0.55 NM (3344 feet) in range.

Sensitive Level 4

Own aircraft altitude is above 10,000 feet P/S/REF/ALT and below 20,000 feet above P/S/REF/ALT. In this mode TAs and RAs will be generated. A TA is generated if the STARS calculates that (1) at the current closing rate a safe miss distance of 1200 feet in relative GPS altitude between one's own aircraft and intruder aircraft will be violated in 45 seconds or (2) separation between one's own aircraft and intruder aircraft is less than 1200 feet in altitude and less than 0.8 NM (4864 feet) in range. A RA is generated if the STARS calculates that (1) at the current closure rate a safe miss distance between own aircraft and intruder aircraft will be violated in 30 seconds. A preventative RA evasive command will be generated if miss distance is between 500 and 750 feet. A corrective (RA) evasive command will be generated if (1) the miss distance is less than 500 feet. or (2) extrapolated separation between one's own aircraft and intruder aircraft is less than 750 feet in altitude and less than 0.8 NM (4864 feet) in range.

Sensitive Level 5

Own aircraft altitude is above 20,000 feet P/S/REF/ALT and below 30,000 feet above P/S/REF/ALT. In this mode both TAs and RAs will be generated. A TA is generated is the STARS calculates that (1) at the current closing rate a safe miss distance of 1200 feet in relative GPS altitude between own aircraft and intruder aircraft will be violated in 45 second or (2) separation between own aircraft and intruder aircraft is less than 1200 feet in altitude and less than 1.10 NM (6688 feet.) in range. A RA is generated is the STARS calculates that at the current closure rate a safe miss distance between one's own aircraft and intruder aircraft will be violated in 35 seconds. A preventative RA evasive command will be generated if miss distance is between 640 and 850 feet. A corrective (RA) evasive command will be generated if (1) the miss distance is less than 640 feet or (2) the extrapolated separation between one's own aircraft and intruder aircraft is less than 1200 feet in altitude and less than 1.10 NM (6688 feet) in range.

Sensitive Level 6

Own aircraft altitude is above 30,000 feet P/S/REF/ALT. In this mode both TAs and RAs will be generated. A TA is generated is the STARS calculates that (1) at the current closing rate a safe miss distance of 1200 feet in relative GPS altitude between own aircraft and intruder aircraft will be violated in 45 seconds or (2) separation between one's own aircraft and intruder aircraft is less than 1200 feet in altitude and less than 1.10 NM (6688 feet) in range. A RA is generated is the STARS calculates that at the current closure rate a safe miss distance between own aircraft and intruder aircraft will be violated in 35 seconds. A preventative RA evasive command will be generated if the extrapolated miss distance is between 740 and 950 feet. A corrective (RA) evasive command will be generated if (1) the miss distance is less than 740 feet or (2) separation between one's own aircraft and intruder aircraft is less than 1200 feet in altitude and less than 1.10 NM (6688 feet) in range.

Figure 13:
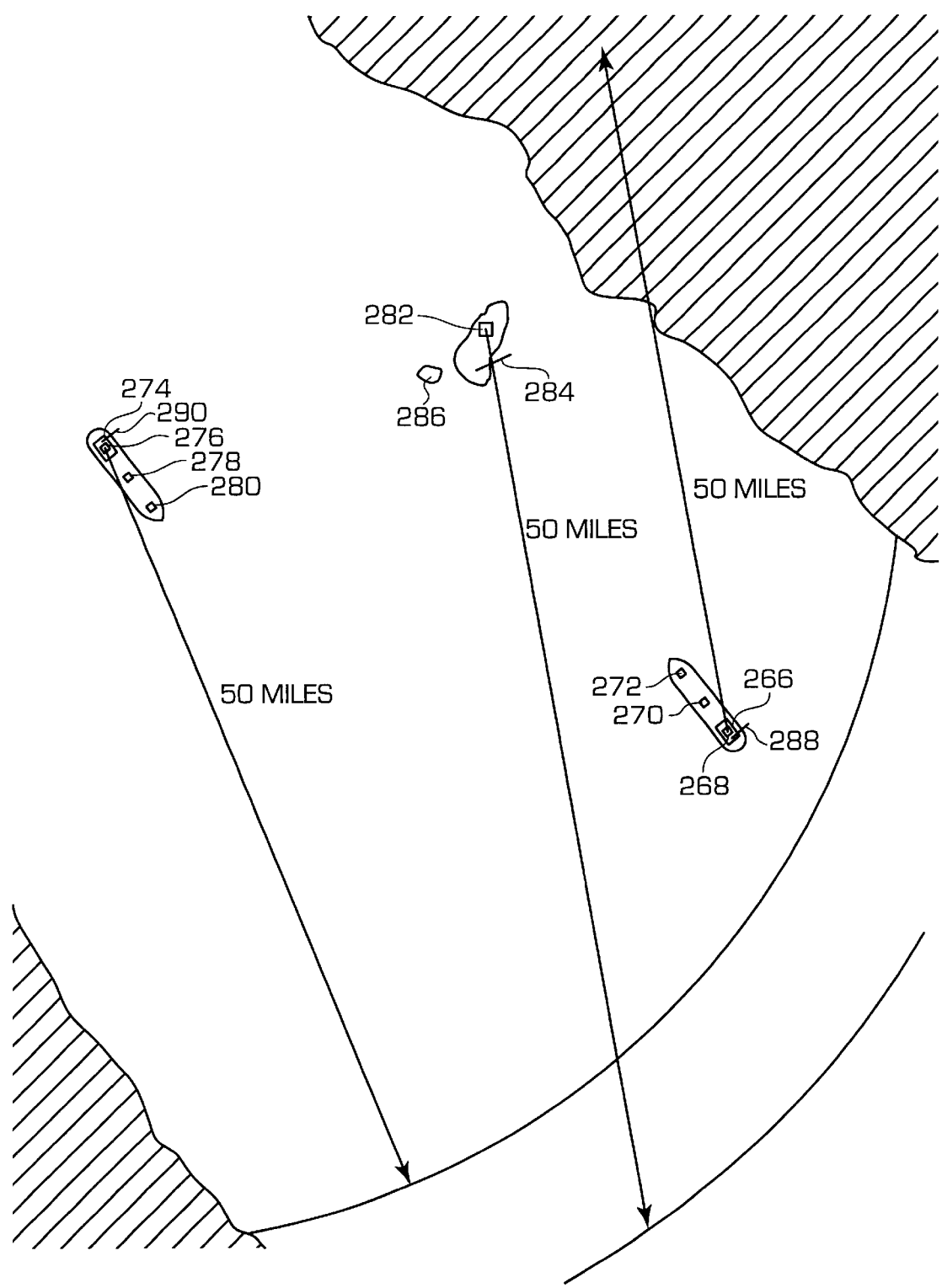
FIG. 13 is a schematic diagram of an automatic collision avoidance system in accordance to a second seagoing vessel embodiment of the present invention.

FIG. 13 shows a second embodiment of the present invention wherein the disclosed STARS apparatus and method could be deployed as a ship anti-collision system. The Ship Satellite Tracking Alert Resolution System (SSTARS) 266, is a self contained shipboard traffic alert and collision avoidance system that utilizes the same methods and apparatus as the STARS 10 but with several changes to adapt the STARS operation to ships.

As well known to the art, large sea going vessels such as supertankers and container ships require a substantial distance to stop or change course. For example, a fully laden supertanker may require several miles to stop. Therefore, it is critical that large vessels coordinate their movements with other vessels in the area while maintaining a safe distance from navigational hazards such as reefs and sand bars. Typically the coordination of ships is conducted by two way voice radio communication with the harbor master. However, as shown in the EXXON Valdez disaster this system is an inadequate collision avoidance method especially in remote areas.

The SSTARS 266 may use the same hardware configuration as the STARS 10. The SSTARS 266 has a three GPS receiver configuration. In the three receiver configuration the receiver antennae are separated by a predetermined distance, for example, one forward 272, one mid-ship 270, and one aft 268. Since the distance between the receiver antennae is known the SSTARS 266 can constantly check whether the receivers are functional by verifying that the reported distance between the receiver antennae remains a constant predetermined distance. Should a receiver report a distant that does not correspond to the other two then that receiver can be disabled. Therefore, the three receiver configuration may be used to continuously check GPS receiver operation.

The SSTARS 266 receives satellite navigational signals on receiver antennae 272, 270, and 268. The SSTARS 266 compares the positions from the receivers to the predetermined distance between the receiver antennae. The SSTARS 266 formats a message as illustrated in FIG. 7. The SSTARS 266 message is the same as the STARS 10 with additional information encoded in the message section 164. The additional information encodes the ship's length, height, tonnage, lading, turn rate, and draw. This information is used by the SSTARS evasive maneuver generator program to senerate navigational evasive maneuvers to keep ships separated. Generally, a lighter tonnage ship in the SSTARS embodiment will be given the more aggressive evasive command while a large vessel is given a more minor course correction. The SSTARS embodiment also equips fixed navigational hazards such as reefs, shoals, and sand bars with a SSTARS 266 type apparatus. It is understood that the SSTARS storage device contains geographic maps. A standard SSTARS can be used to track molecular navigational hazards such as icebergs. The SSTARS fixed navigational embodiment may be preprogrammed with a fixed position, i.e. a fixed navigational hazard does not need to continuously update and track its own movements since it is fixed. The fixed embodiment also offers the advantage of allowing the collision avoidance system to avoid collisions with temporary or newly occurring navigational hazards such as newly formed sand bars that are not on navigational maps.

The fixed embodiment, in addition, may allow the SSTARS to correlate an internal topographical SSTARS database (a Map) with a known fixed SSTARS beacon signal. The SSTARS 266 database may contain information concerning ports, port master frequencies, topographical maps of the water ways, water hazards, and seasonal information. The SSTARS transceiver system operates primarily with frequencies for line of sight distance operation i.e. in the UHF, VHF, or SHF frequency range. For example, the line of sight limitation for a ship with a 200 foot. tall transmit antenna and another ship with a 200 foot receiving antenna is approximately 40 miles. However, it is without the scope of the invention that the SSTARS may use HF frequencies and sky-wave propagation to give the SSTARS a long range mode.

Thus, the SSTARS can act like a radio warning lighthouse to alert passing ships of dangerous waters.

What is claimed is:

1. A method for automatically coordinating a vehicle collision avoidance maneuver between vehicles comprising the steps of:
   establishing a data link between a first and a second vehicle;
   receiving and transmitting position and movement information for said vehicles between said vehicles;
   generating an onboard evasive maneuver for said first vehicle;
   synchronizing the transmission of said evasive maneuver to said second vehicle through said data link;
   transmitting said evasive maneuver from said first vehicle to said second vehicle through said data link; and
   displaying on a display device the evasive maneuver of said first vehicle.

2. The method of claim 1 further comprising the step of:
   coordinating and generating an evasive maneuver at said second vehicle based on predetermined parameters and said evasive maneuver from said first vehicle.

3. The method of claim 1 wherein said data link utilizes the Global Positioning System's precision time to synchronize transmission of said position, movement and evasive maneuvers between said vehicles thereby preventing simultaneous transmission of said position, movement and evasive maneuvers by each said vehicle; and
   said data link synchronizes the transmission of said position, movement and evasive maneuver information by utilizing the Time Division Multiple Access protocol to assign each said transmitting vehicle a transmission time slot.

4. The method of claim 2 wherein said vehicle is an aircraft.

5. The method of claim 2 wherein said vehicle is a sea going vessel.

6. The method of claim 4 wherein said automatic execution of said evasive maneuvers by each said aircraft is accomplished through integration with auto pilot system of said aircraft.

7. The method of claim 1 wherein said step of generating an onboard evasive maneuver for said first aircraft comprises the further step of:

generating said evasive maneuver based in part on the altitude window information received from a user control interface on said first aircraft.

8. A method for generating and coordinating an aircraft collision avoidance maneuver between a first and a second aircraft, said method comprising the steps of:

receiving global positioning signals at a GPS receiver located on board said first aircraft;

calculating said first aircraft longitude, latitude and present altitude from said global positioning signals;

recovering a precision clocking signal from said global positioning signals at said first aircraft;

synchronizing a time domain multiple access transmission from said first aircraft to said precision clocking signal recovered from said global positioning signals, said precision clocking signal enabling said time domain multiple access transmission to synchronize to an assigned transmission slot;

receiving information about said first aircraft's altitude window information from a user control interface on said first aircraft;

transmitting said longitude, latitude, present altitude, aircraft identification and altitude window information from said first aircraft on said time domain multiple access transmission in said assigned transmission slot;

receiving global positioning signals at a GPS receiver located on board a second aircraft;

calculating said second aircraft longitude, latitude and present altitude from said global positioning signal;

recovering a precision clock signal from said global positioning signals at said second aircraft;

receiving information about said second aircraft's altitude window information from a user control interface on said second aircraft;

synchronizing a time domain multiple access reception at said second aircraft to said precision clocking signal recovered from said global positioning signals, said precision clocking signal synchronizing said time domain multiple access transmission from said first aircraft to said time domain multiple access reception at said second aircraft when said first and said second aircraft are located within the range of said time domain multiple access transmission and said time domain multiple access reception by direct communication between said first and second aircraft;

generating an evasive maneuver on said second aircraft if said first and said second aircraft extrapolated trajectory based on said longitude, latitude, present altitude and altitude window information of said first and second aircraft place said first and said second aircraft within a predetermined zone at the same time; and displaying said evasive maneuver on a display device at said second aircraft, said evasive maneuver directing said second aircraft pilot to change the course of said second aircraft to execute said evasive maneuver.

9. The method of claim 8 further comprising the steps of:

synchronizing a time domain multiple access transmission from said second aircraft to said precision clocking signal recovered from said global positioning signals, said precision clocking signal enabling said time domain multiple access transmission to synchronize to an assigned transmission slot; and transmitting the evasive maneuver from said second aircraft on said synchronized time domain multiple access carrier.

* * * * *